United States Patent
Chey et al.

(10) Patent No.: US 12,433,540 B2
(45) Date of Patent: Oct. 7, 2025

(54) SELF-INFLATING ANORECTAL EXPULSION DEVICE

(71) Applicant: THE REGENTS OF THE UNIVERSITY OF MICHIGAN, Ann Arbor, MI (US)

(72) Inventors: William D. Chey, Ann Arbor, MI (US); James A. Ashton-Miller, Ann Arbor, MI (US); Eric D. Shah, Ann Arbor, MI (US); Jason Baker, Ann Arbor, MI (US); Adrienne Harris, Clinton, MI (US); Gene Parunak, Saline, MI (US); Aaron Miles Kehrer, Saline, MI (US)

(73) Assignee: THE REGENTS OF THE UNIVERSITY OF MICHIGAN, Ann Arbor, MI (US)

(*) Notice: Subject to any disclaimer, the term of this patent is extended or adjusted under 35 U.S.C. 154(b) by 1198 days.

(21) Appl. No.: 17/274,942

(22) PCT Filed: Sep. 9, 2019

(86) PCT No.: PCT/US2019/050155
§ 371 (c)(1),
(2) Date: Mar. 10, 2021

(87) PCT Pub. No.: WO2020/055722
PCT Pub. Date: Mar. 19, 2020

(65) Prior Publication Data
US 2022/0039751 A1   Feb. 10, 2022

Related U.S. Application Data

(60) Provisional application No. 62/729,079, filed on Sep. 10, 2018.

(51) Int. Cl.
*A61B 5/00* (2006.01)

(52) U.S. Cl.
CPC .......... *A61B 5/6853* (2013.01); *A61B 5/4222* (2013.01)

(58) Field of Classification Search
CPC ... A61B 5/6853; A61B 5/4222; A61B 5/1107; A61B 5/4255; A61M 25/10183
See application file for complete search history.

(56) References Cited

U.S. PATENT DOCUMENTS

| | | |
|---|---|---|
| 3,509,884 A | 5/1970 | Bell |
| 4,253,201 A | 3/1981 | Ross et al. |

(Continued)

FOREIGN PATENT DOCUMENTS

WO    WO-01/91844 A1    12/2001

OTHER PUBLICATIONS

European Patent Application No. 19773622.6, Communication Pursuant to Article 93(3) EPC, dated Jun. 1, 2023.

(Continued)

*Primary Examiner* — Tse W Chen
*Assistant Examiner* — Joseph A Tombers
(74) *Attorney, Agent, or Firm* — MARSHALL, GERSTEIN & BORUN LLP

(57) ABSTRACT

An anorectal expulsion device includes a balloon having a wall that extends between proximal and distal ends of the balloon and defines a balloon interior. The balloon interior contains a self-expanding, low compression-set material (e.g., open cell foam). The device also includes a catheter that extends through the proximal end of the balloon and at least a portion of the balloon interior. An interior of the catheter is in fluid communication with the balloon interior. The device also includes a termination component (e.g., a cap or a valve) coupled to the catheter at a position along the catheter that is outside of and proximal to the proximal end of the balloon (e.g., at the proximal end of the catheter). The (Continued)

physical configuration of the termination component is adjustable, and controls whether the balloon interior is in fluid communication with the external environment.

15 Claims, 8 Drawing Sheets

(56) References Cited

U.S. PATENT DOCUMENTS

| | | | |
|---|---|---|---|
| 4,624,671 A | 11/1986 | Kress | |
| 4,650,487 A | 3/1987 | Chaglassian | |
| 4,687,002 A | 8/1987 | Lahr | |
| 5,383,855 A * | 1/1995 | Nicholson | A61M 25/104 604/920 |
| 5,919,136 A * | 7/1999 | Rao | A61B 5/42 600/431 |
| 6,348,039 B1 | 2/2002 | Flachman et al. | |
| 7,108,677 B2 * | 9/2006 | Courtney | A61B 17/22031 600/156 |
| 8,080,031 B2 | 12/2011 | Isham | |
| 8,241,317 B2 | 8/2012 | Isham et al. | |
| 8,500,771 B2 | 8/2013 | Isham | |
| 8,672,882 B2 | 3/2014 | Rotella et al. | |
| 9,888,881 B2 * | 2/2018 | Hulvershorn | A61B 5/4896 |
| 11,364,019 B1 * | 6/2022 | Krause | A61B 5/6853 |
| 2003/0135154 A1 * | 7/2003 | Heiniger | A61M 5/14248 604/67 |
| 2009/0221899 A1 | 9/2009 | Isham | |
| 2009/0270955 A1 | 10/2009 | Magers et al. | |
| 2016/0367747 A1 * | 12/2016 | Loske | A61M 25/007 |
| 2017/0332958 A1 | 11/2017 | Gregersen et al. | |
| 2019/0307416 A1 * | 10/2019 | Corl | A61B 8/4483 |

OTHER PUBLICATIONS

Search Report and Written Opinion in International Application No. PCT/US2019/050155 dated Feb. 6, 2020, 13 pages.

European Patent Application No. 19773622.6, Communication Pursuant to Article 94(3) EPC, dated Feb. 6, 2025.

* cited by examiner

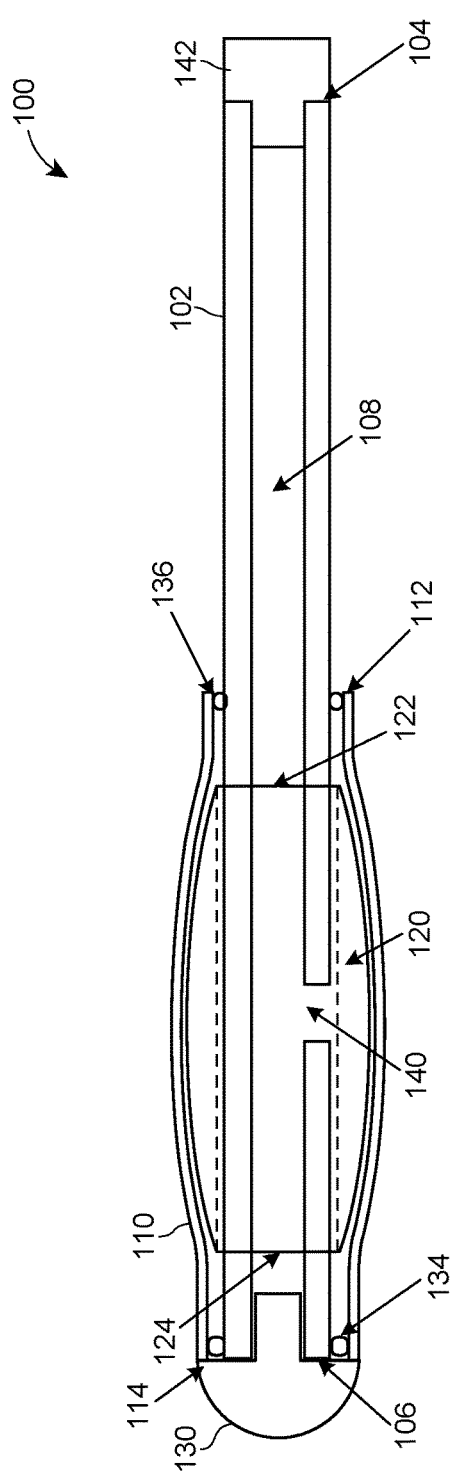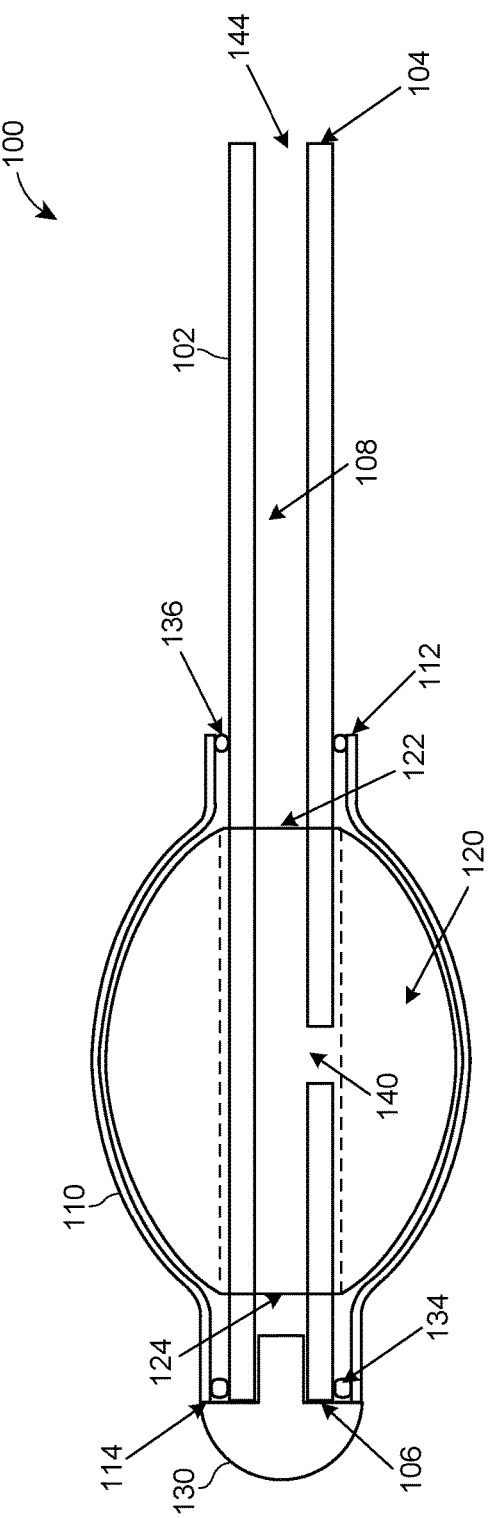
FIG. 1A
FIG. 1B

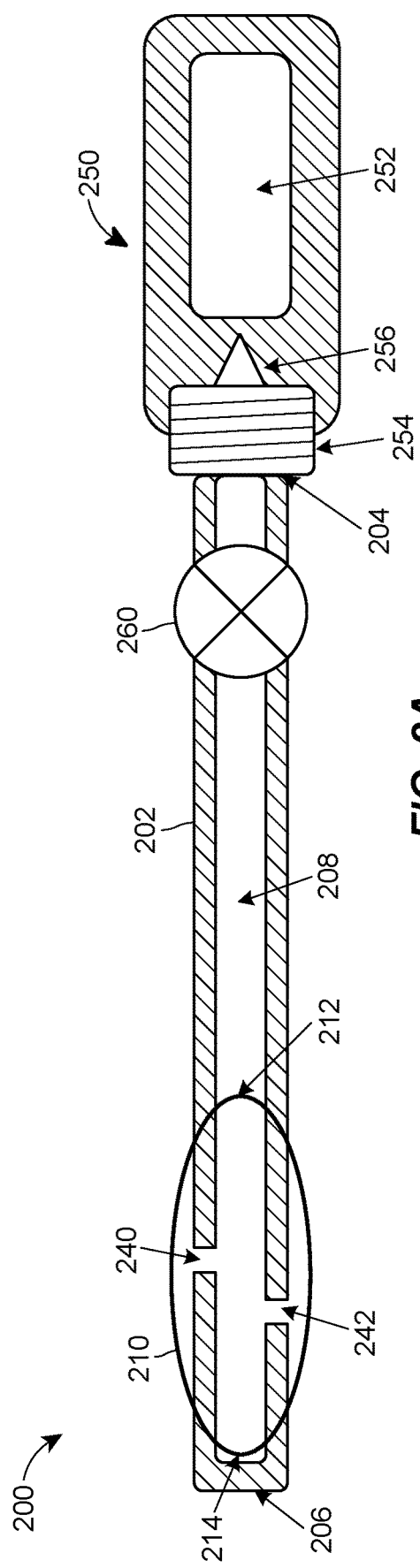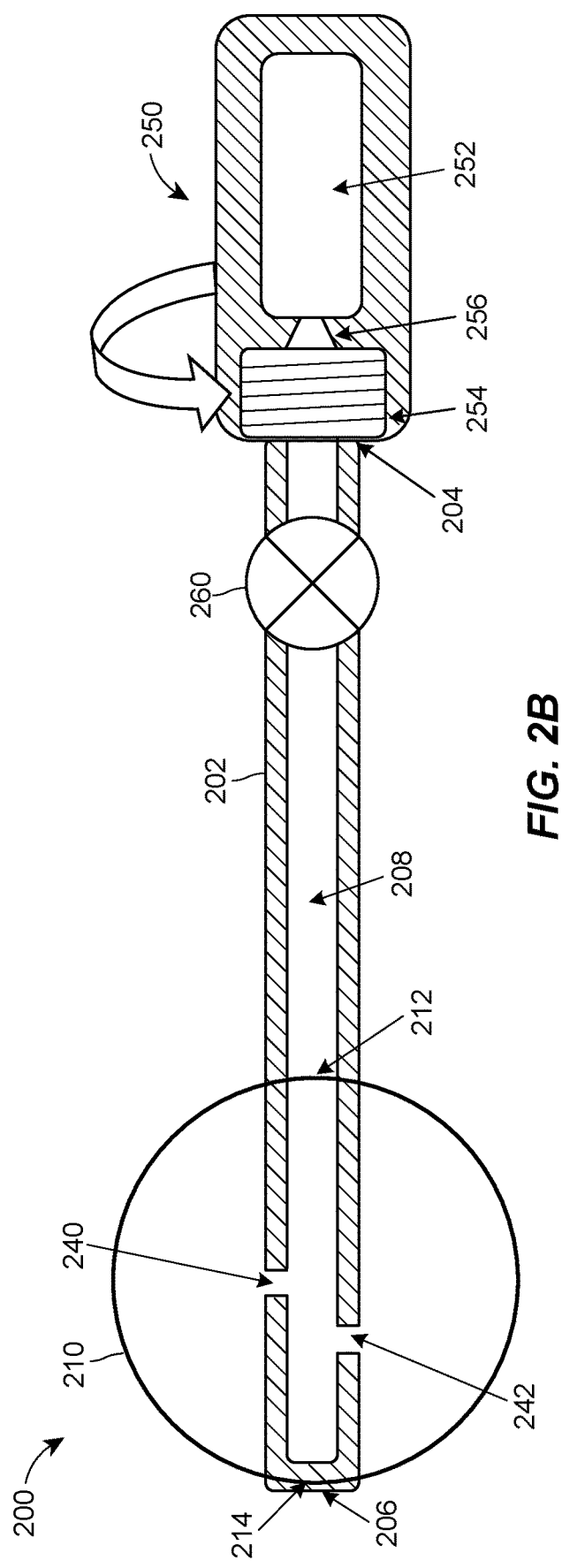

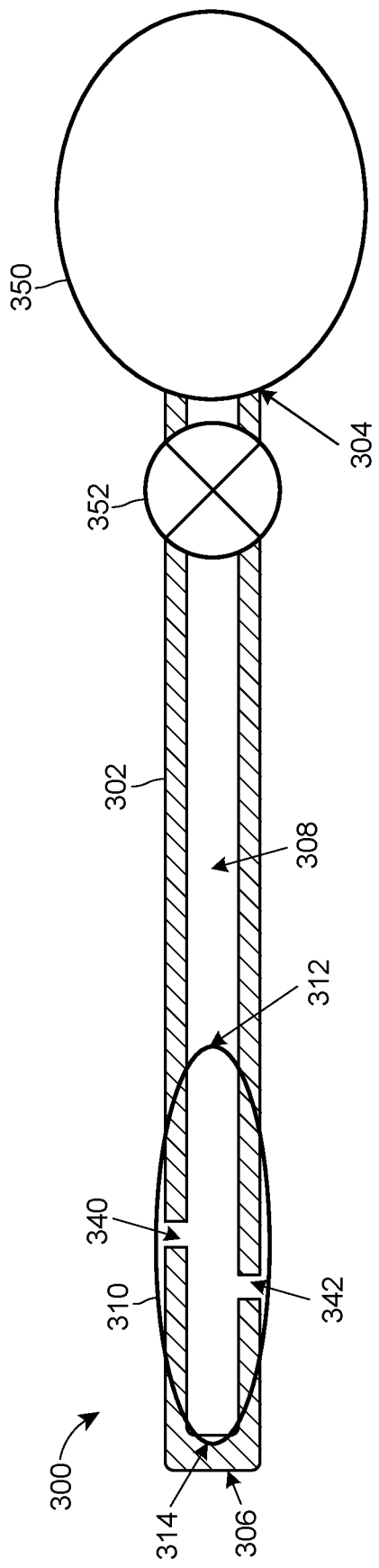
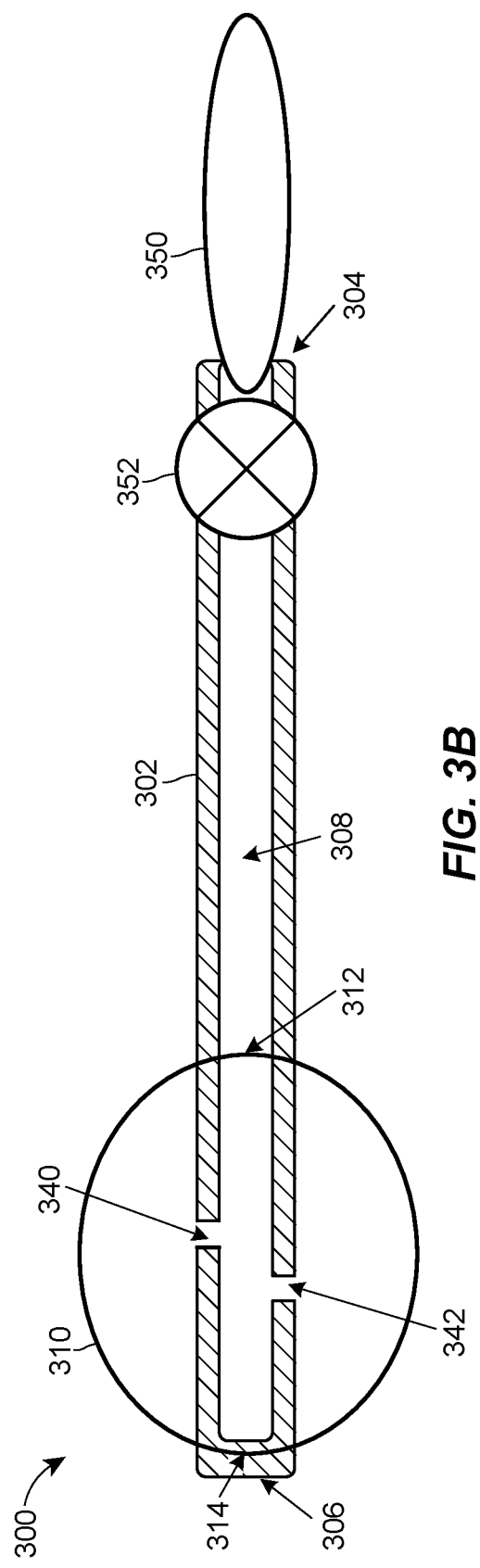
FIG. 3A
FIG. 3B

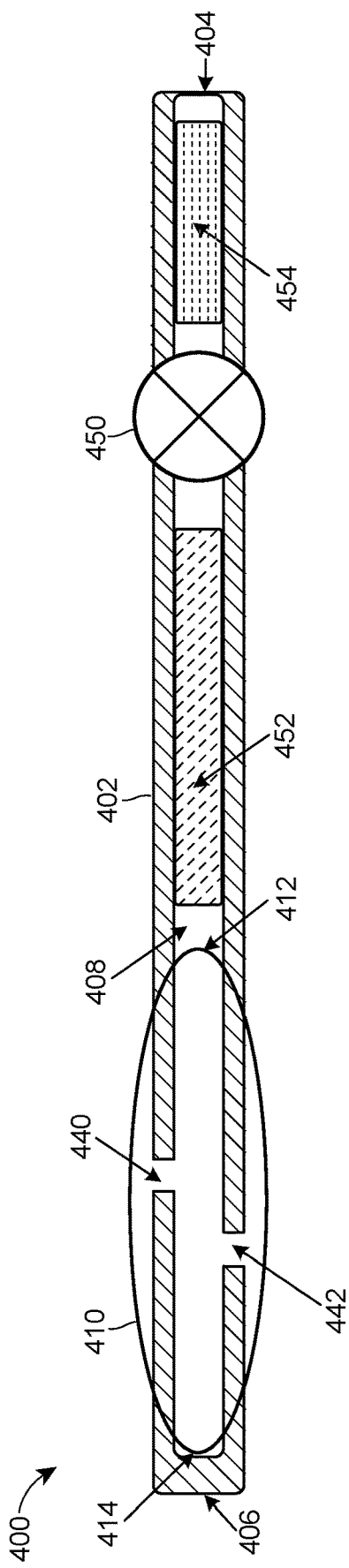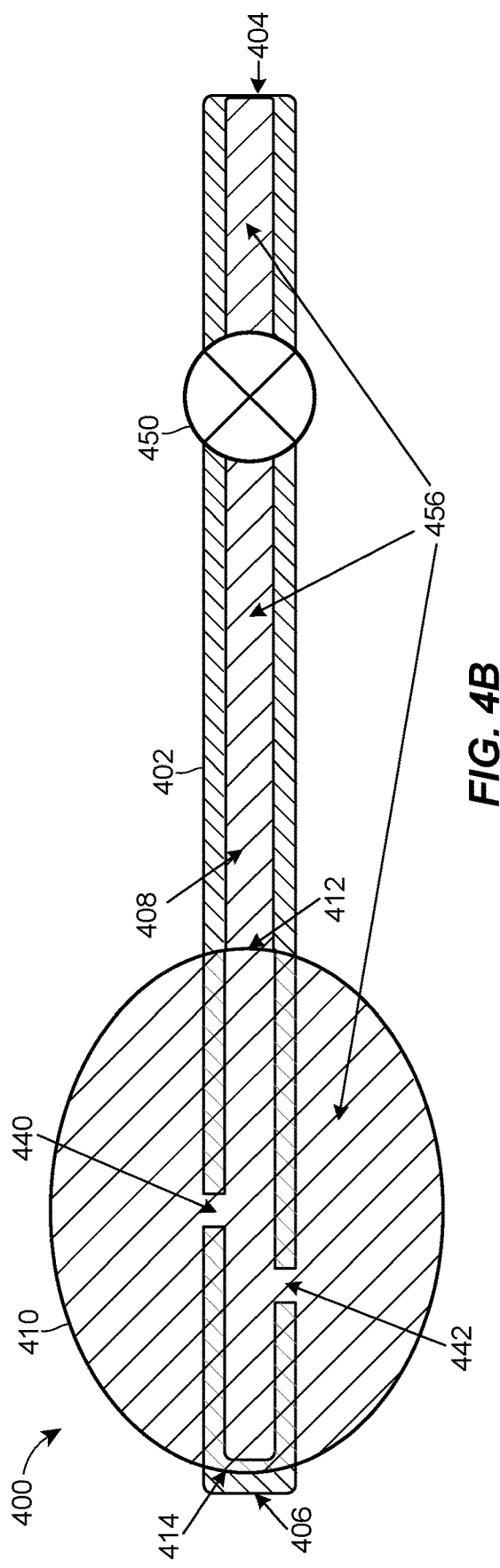

SELF-INFLATING ANORECTAL EXPULSION DEVICE

CROSS-REFERENCE TO RELATED APPLICATIONS

Priority is claimed to U.S. Provisional Patent Application No. 62/729,079, filed Sep. 10, 2018, the entirety of which is hereby incorporated herein by reference.

TECHNICAL FIELD

The present application relates generally to medical devices for diagnosing medical conditions and, more specifically, to low-cost, easy-to-use devices and methods for testing anorectal expulsion function of a patient.

BACKGROUND

Obstructed defecation, or obstructed defecation syndrome, is a common, and often discomforting, gastrointestinal (GI) complaint. Obstructed defecation can often be attended by decreased quality of life, decreased work productivity, and increased health care costs, and can be a symptom of a number of different anorectal disorders.

One technique that has been used to diagnose anorectal disorders for patients with obstructed defecation involves inserting a fluid-filled balloon into the patient's rectum, to assess a patient's ability to evacuate stool from the rectum. A clinician may then measure the time required for the patient to expel the device, with the expulsion time being a good indicator of the patient's general ability to pass a stool once the stool has moved into the rectum. While this approach may be low cost, it can be difficult for the clinician to insert and inflate the balloon, and can be an untidy process. Moreover, it can be difficult for a clinician to determine precisely when the balloon (simulated stool) has been passed, as the balloon may be temporarily hidden from view (e.g., due to the location of the clinician relative to the patient when the patient is in a defecating position).

Other devices for testing anorectal expulsion functions have also been proposed. In U.S. Pat. No. 5,919,136 (Rao et al.), for example, a generally stool-shaped device includes inner and outer shells, with the space between the shells being filled with silicone gel to make the device deformable. A fill tube lumen provides a means through which fluid may be injected into, or withdrawn from, the inner shell of the device to adjust the volume of the device in situ. The silicone gel between the inner and outer shells may contain a radiopaque component that is homogenously distributed throughout, to facilitate in situ radiographic observation of the device during expulsion. While this approach can improve upon the fluid-filled balloon technique described above by facilitating (to a degree) the process of inserting the device into the rectum, and by providing more precise information relating to deformation of the simulated stool as the device is expelled, it nevertheless has significant drawbacks. For example, the clinician may need to use an independent device or machine to inflate the device in situ. Further, the technique requires radiography to image the simulated stool device in situ. In view of the external devices or machines that are used with the device (e.g., an X-ray machine), the technique can be cumbersome and quite expensive. Moreover, the technique requires exposing the patient to potentially harmful radiation.

BRIEF DESCRIPTION OF THE DRAWINGS

FIGS. 1A and 1B provide cutaway views of an example self-inflating anorectal expulsion device that utilizes a self-expanding, low compression-set material, when a distal balloon of the device is in a deflated and inflated state, respectively.

FIGS. 2A and 2B provide cutaway views of an example self-inflating anorectal expulsion device that utilizes a compressed gas cylinder, when a distal balloon of the device is in a deflated and inflated state, respectively.

FIGS. 3A and 3B provide cutaway views of an example self-inflating anorectal expulsion device that utilizes a proximal balloon, when a distal balloon of the device is in a deflated and inflated state, respectively.

FIGS. 4A and 4B provide cutaway views of an example self-inflating anorectal expulsion device that utilizes chemical expansion materials, when a distal balloon of the device is in a deflated and inflated state, respectively.

DETAILED DESCRIPTION

Figure 5:
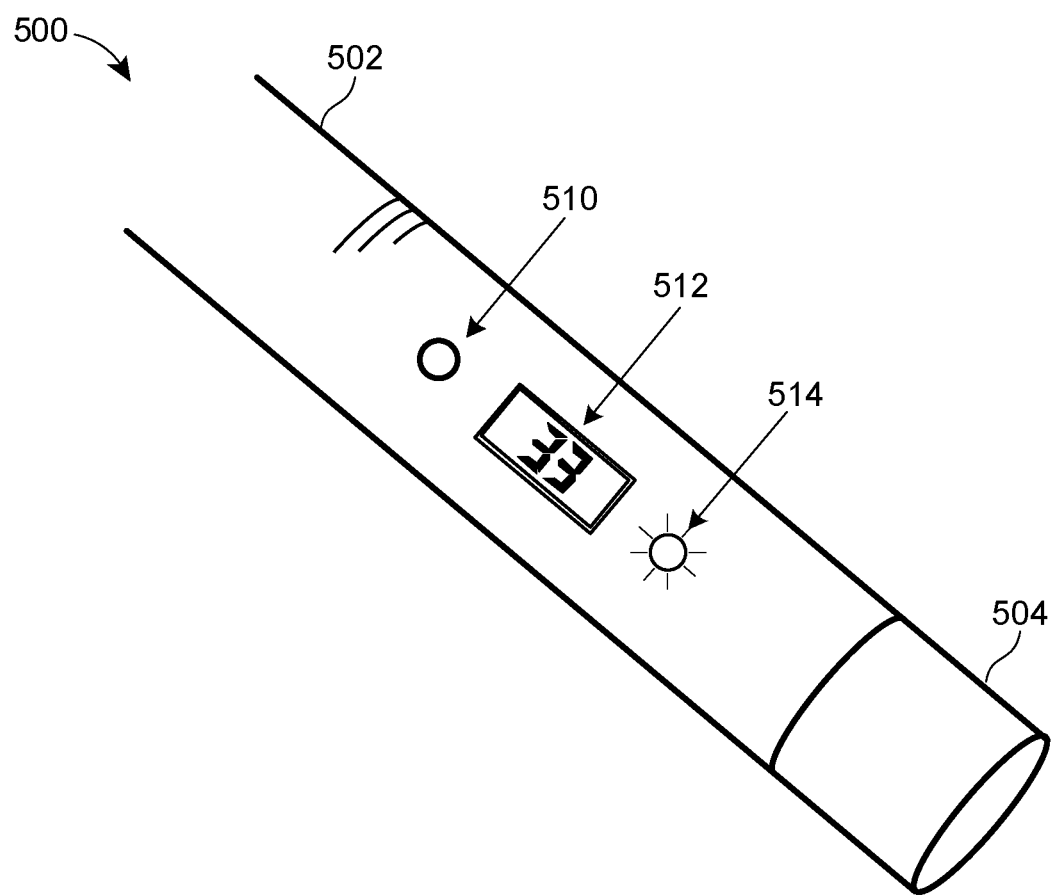
FIG. 5 depicts a portion of an example self-inflating anorectal expulsion device with features for determining and indicating expulsion time.

In embodiments described herein, an anorectal expulsion device may be used for standardized testing of anorectal expulsion function. Generally, the device includes some mechanism by which a distal portion of the device is compressed and/or deflated before insertion into a patient's rectum, and, in response to some simple manipulation by a user (e.g., clinician), inflates after insertion into the patient's rectum. Thus, the device may have a relatively small profile (e.g., diameter) prior to and during the process of insertion, reducing the size of any packaging, and/or making the insertion task easier for the clinician and less uncomfortable for the patient.

In each of the embodiments described herein, the anorectal expulsion device may include a catheter (e.g., a single lumen catheter) coupled to (e.g., extending into and/or passing through) a distal balloon. The catheter may be in fluid communication with the interior of the balloon via one or more openings in the catheter wall near the distal end of the catheter, and may be long enough to extend well outside the patient's body even when the distal balloon is entirely within the patient's rectum (e.g., inserted past the sphincter).

In a first aspect, the balloon interior is at least partially filled with a self-expanding, low compression-set material, such as open cell polyurethane foam. Initially, the fill material may be in a compressed state, with a vacuum or near-vacuum within the balloon preventing the fill material from expanding. To maintain the low pressure within the balloon, an area of the catheter proximal to the balloon (e.g., the proximal end of the catheter) may include a termination component that, when closed, provides a fluid-tight seal between the catheter lumen(s) and the external environment. The termination component may be a valve (e.g., stopcock) or cap, for example.

The compressed state of the fill material, and possibly lubrication on the exterior of the balloon and/or catheter, may facilitate insertion of at least the balloon portion of the device into a patient's rectum by a clinician. After insertion, the clinician may remove the termination component (e.g., unscrew or pull off a cap, or turn a lever of a valve, etc.), thereby causing the balloon interior to be in fluid communication (via the catheter lumen(s)) with the environment external to the proximal end of the catheter. The higher pressure of the external environment (e.g., the clinician's office) causes air to enter the proximal end of the catheter, travel through the lumen(s) and lumen opening(s), and into the open cell polyurethane foam or other fill material, thereby causing the fill material to self-expand. The expanded fill material may cause the balloon to closely approximate the size and/or compressibility of a typical stool.

The clinician may then observe the amount of time required for the patient to expel at least the balloon portion of the anorectal expulsion device. If the patient cannot expel the device within a reasonable amount of time, the clinician may use the catheter to pull the device completely out of the patient's rectum. Alternatively (e.g., if the clinician experiences difficulty in removing the device), the clinician may close the valve or cap and use a syringe to withdraw air from the fill material (e.g., by inserting the syringe needle into the fill material, and then pulling back the syringe plunger to create a vacuum within the syringe).

In a second aspect, the interior of the balloon of the device may initially be in a collapsed/deflated state, and need not contain any fill material. The balloon interior may or may not be initially maintained at low pressure (e.g., vacuum) conditions. A high-pressure, compressed gas cylinder may be coupled to (e.g., partially screwed on to) a compatible connector at the proximal end of the catheter. The gas cylinder may use a screw compression system, in which a spike in the gas cylinder punctures a gas reservoir within the cylinder when a threaded connector (or other connector type) of the gas cylinder is tightened onto a mating connector.

The deflated state of the balloon, and possibly lubrication on the exterior of the balloon and/or catheter, may facilitate insertion of at least the balloon portion of the device into a patient's rectum by a clinician. After insertion, the clinician may cause the gas cylinder to couple/mate more tightly or closely to the proximal end of the catheter (e.g., by manually rotating the cylinder relative to the catheter), which in turn causes the spike to puncture the compressed gas reservoir. Once punctured, the higher pressure of the compressed gas causes the gas (e.g., $CO_2$, $N_2$, etc.) to enter the proximal end of the catheter, travel through the lumen(s) and lumen opening(s), and into the balloon interior, thereby inflating the balloon. Alternatively, the clinician may cause the compressed gas reservoir to be punctured by another mechanism (e.g., squeezing a cap containing the reservoir). Regardless of the puncturing mechanism, the pressure of the compressed gas may be such as to cause the inflated balloon to closely approximate the size and/or compressibility of a typical stool.

The clinician may then observe the amount of time required for the patient to expel at least the balloon portion of the anorectal expulsion device. If the patient cannot expel the device within a reasonable amount of time, the clinician may use the catheter to pull the device completely out of the patient's rectum. To assist removal, the clinician may open a release valve along the catheter, thereby releasing the gas trapped within the device and at least partially deflating the balloon.

In a third aspect, the balloon interior may initially be in a collapsed/deflated state, while a second balloon at the proximal end of the catheter may initially be inflated with a fluid (e.g., air or water). The second, proximal balloon may also be in fluid communication with the proximal end of the catheter lumen(s). A valve located along the catheter between the distal and proximal balloons is initially closed to prevent the distal and proximal balloons from being in fluid communication with each other.

The deflated state of the distal balloon, and possibly lubrication on the exterior of the balloon and/or catheter, may facilitate insertion of at least the distal balloon portion of the device into a patient's rectum by a clinician. After insertion, the clinician may manually open the catheter valve, thereby causing the interiors of the two balloons to be in fluid communication with each other via the catheter lumen(s). The higher pressure of the inflated, proximal balloon causes the fluid within the proximal balloon to enter the proximal end of the catheter, travel through the lumen(s) and lumen opening(s), and into the distal balloon, thereby causing the distal balloon to inflate. The clinician may also assist the transfer of fluid to the distal balloon by manually squeezing the proximal balloon (e.g., directly by hand, or using a handle that provides leverage, etc.). Once the air, water, or other fluid has been transferred to the distal balloon, the clinician may close the catheter valve to prevent the fluid from returning to the distal balloon while the device is into the patient's rectum. The inflated distal balloon may closely approximate the size and/or compressibility of a typical stool.

The clinician may then observe the amount of time required for the patient to expel at least the distal balloon portion of the anorectal expulsion device. If the patient cannot expel the device within a reasonable amount of time, the clinician may use the catheter to pull the device completely out of the patient's rectum. To assist removal, the clinician may again open the catheter valve, thereby allowing the air or other fluid to at least partially return to the proximal balloon such that the distal balloon is at least partially deflated.

In a fourth aspect, the balloon interior may initially be in a collapsed/deflated state. A valve located along the catheter (at a position proximal to the balloon) may, when in its initial closed state, prevent two portions of the catheter lumen(s) from being in fluid communication with each other. The catheter lumen(s) may initially contain a first material on the distal side of the valve, and a second material on the proximal side of the valve. The proximal and distal materials are selected such that, when brought into contact, the two materials create a chemical expansion reaction. For example, the materials may be components of a two-part expanding foam, sodium bicarbonate and hydrogen peroxide, etc.

The deflated state of the distal balloon, and possibly lubrication on the exterior of the balloon and/or catheter, may facilitate insertion of at least the distal balloon portion of the device into a patient's rectum by a clinician. After insertion, the clinician may manually open the catheter valve, thereby causing the two materials to come into contact with each other and create a chemical expansion reaction. The higher pressure resulting from the expansion reaction in the closed/sealed system of the device causes the distal balloon to expand/inflate. The inflated balloon may closely approximate the size and/or compressibility of a typical stool.

The clinician may then observe the amount of time required for the patient to expel at least the balloon portion of the anorectal expulsion device. If the patient cannot expel the device within a reasonable amount of time, the clinician may use the catheter to pull the device completely out of the patient's rectum.

In any of the four aspects described above, the anorectal expulsion device may include mechanisms for measuring and/or indicating the amount of time it takes the patient to expel the device, and/or a binary indicator of whether the device was expelled within a normal (or expected, acceptable, etc.) amount of time. For example, in the first and third aspects described above, the device may include a flow sensor in a lumen of the catheter, and a relatively simple processing unit may use flow measurements to determine when the device is passing through, or has just passed through, the patient's sphincter. The anorectal expulsion device may also include an input (e.g., a timer reset button) that the clinician may activate (e.g., press) immediately after (or while, etc.) inserting the device into the patient's rectum.

The anorectal expulsion device may include various mechanisms for indicating the time to expulsion, and/or indicating whether that time was normal/acceptable/etc. For example, the device may include an electronic display that shows the expulsion time, a light emitting diode (LED) or other indicator that indicates whether the expulsion time is greater than some threshold time (e.g., green if less than the threshold, red if greater than the threshold), a speaker that emits a tone if the expulsion time is greater than the threshold time, and/or another suitable visual or audio indicator.

These aspects and embodiments, as summarized above and as described in further detail below, can provide significant advantages relative to prior art devices and techniques. For example, the aspects/embodiments may allow for easier and cleaner insertion of the device into, and/or removal of the device from, the patient's rectum. Moreover, the aspects/embodiments may provide precise expulsion time information that is not dependent on direct observation by the clinician, and may provide a very low cost solution (e.g., as compared to techniques that require X-ray machines and/or other external devices/machines/systems). Other advantages may be specific to particular aspects/embodiments, as discussed further below.

Figure 6:
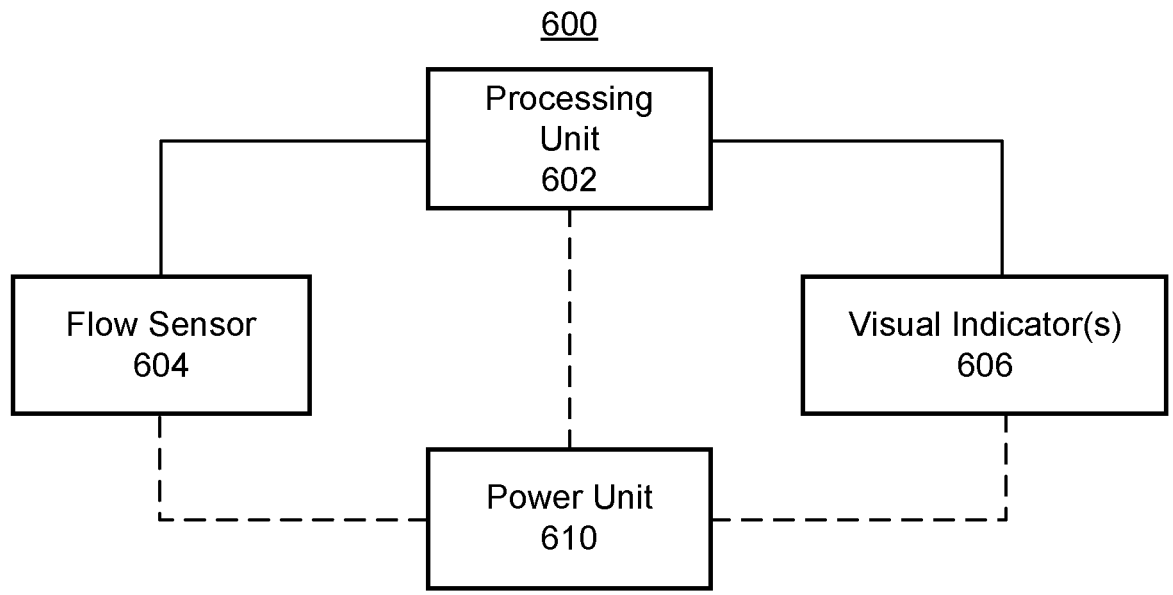
FIG. 6 is a block diagram of example electronic components of the self-inflating anorectal expulsion device of FIG. 5.

Various embodiments of the anorectal expulsion devices and related methods/techniques discussed above will now be described in greater detail with reference to FIGS. 1 through 10. FIGS. 1A and 1B depict an example anorectal expulsion device according to the first aspect, FIGS. 2A and 2B depict an example anorectal expulsion device according to the second aspect, FIGS. 3A and 3B depict an example anorectal expulsion device according to the third aspect, and FIGS. 4A and 4B depict an example anorectal expulsion device according to the fourth aspect. FIG. 5 depicts example features an anorectal expulsion device, relating to determining and indicating expulsion time. FIG. 6 is a block diagram depicting example electronic components that may be included in the anorectal expulsion device of FIG. 5. Finally, FIGS. 7 through 10 are flow diagrams of example methods for testing the anorectal expulsion function of a patient using anorectal expulsion devices similar to the devices of FIGS. 1 through 4, respectively.

Turning first to FIGS. 1A and 1B, cutaway views of an anorectal expulsion device 100 are depicted. FIG. 1A depicts device 100 in its compressed state, at a time prior to insertion of device 100 into the patient's rectum (e.g., the form in which device 100 is provided by a supplier, in some embodiments). FIG. 1A may also represent the form of device 100 while the clinician inserts device 100 into the patient's rectum, and for some relatively short time period thereafter. FIG. 1B depicts device 100 in its expanded state, at a time after device 100 has been inserted and (in some embodiments) the clinician has caused device 100 to change from its compressed state to the expanded state (as discussed further below).

Device 100 includes a catheter 102 having a proximal end 104 and a distal end 106, with the wall of catheter 102 defining a lumen 108. While FIG. 1A depicts only a single lumen 108, in other embodiments catheter 102 may include two or more lumens extending between proximal end 104 and distal end 106. Device 100 also includes a distal balloon 110 having a proximal end 112 and a distal end 114. Balloon 110 may surround the entire circumference of the wall of catheter 102 between the balloon's proximal end 112 and distal end 114, and includes openings at ends 112, 114 to permit passage of catheter 112. In the embodiment of FIG. 1A, distal end 114 of balloon 110 is aligned with distal end 106 of catheter 102, with both terminating in a distal cap 130.

Catheter 102 may be tubular in shape, for example, and may be formed of silicone, polyvinyl chloride (PVC), polyurethane, and/or any other suitable material. Preferably, catheter 102 is formed of a material that provides enough stiffness for a clinician grasping catheter 102 at a location proximal to balloon 110 to easily feed device 100 into the patient's rectum. However, the material may be flexible enough to allow catheter 102 (or at least, a proximal portion of catheter 102) to be easily bent by the clinician. In some embodiments, catheter 102 has an outer diameter that is fixed between 1 and 20 millimeters. Preferably, the outer diameter is between 5 and 15 millimeters. Catheter 102 may be long enough to extend well outside the patient's body even when balloon 110 is entirely within the patient's rectum (e.g., inserted past the sphincter).

At its distal end 114, balloon 110 may be fixed to catheter 102 by a distal seal 134. Distal seal 134 may be glue between catheter 102 and balloon 110, or may be thermal or solvent bonded, for example, and provides a fluid-tight seal between balloon 110 and the outside surface of catheter 102. That is, distal seal 134 may prevent fluid communication between the interior of balloon 110 and the environment outside of balloon 110. In some embodiments, distal seal 134 is instead a compression ring that encircles balloon 110 at or near its distal end 114, and prevents any fluid communication between the interior of balloon 110 and the external environment at the distal end 114 of balloon 110. Distal cap 130 may be formed of any suitable material (e.g., silicone, PVC, polyurethane, etc.), and may be rounded to prevent trauma when device 100 is inserted into a patient's rectum. Distal cap 130 provides a fluid-tight seal, to prevent fluid communication between lumen 108 and the environment external to device 100 at the distal end 114 of balloon 110.

At its proximal end 112, balloon 110 may be fixed to catheter 102 by a proximal seal 136. Proximal seal 136 may be glue between catheter 102 and balloon 110, or may be thermal or solvent bonded, for example, and provides a fluid-tight seal between balloon 110 and the outside surface of catheter 102. That is, similar to distal seal 134, proximal seal 136 may prevent fluid communication between the interior of balloon 110 and the environment outside of balloon 110 at the proximal end 112 of balloon 110. In some embodiments, proximal seal 136 is instead a compression ring that encircles balloon 110 at or near its proximal end 112, and prevents any fluid communication between the interior of balloon 110 and the external environment at the proximal end 112 of balloon 110.

In other embodiments, balloon 110 may not extend as far in the distal direction as catheter 102, and distal seal 134 may be located some distance proximal to the distal end 106 of catheter 102. Alternatively, balloon 110 may extend past the distal end 106 of catheter 102. In some embodiments, balloon 110 does not include any opening at its distal end 114, and therefore may entirely cover the proximal end of lumen 108 (e.g., in place of, or in addition to, distal cap 130).

The interior of balloon 110 (i.e., the space between the wall of balloon 110 and the exterior of the wall of catheter 102, and between the two ends 112, 114 of balloon 110) is at least partially filled with a fill material 120 extending from a proximal end 122 to a distal end 124. Fill material 120 is a self-expanding, low compression-set material, i.e., a material that can be compressed by an inwardly-directed external force (e.g., squeezing of the material), but automatically returns to its fully expanded state (or at least substantially returns to its fully expanded state) when exposed to atmospheric pressure and not acted upon by other external forces. For example, fill material 120 may be, or include, an open cell foam, such as open cell polyurethane foam.

Fill material 120 may be annularly shaped such that fill material 120 entirely surrounds catheter 102. In some embodiments, to better simulate a stool shape when in the expanded state shown in FIG. 1B, fill material 120 is relatively thin at ends 122, 124, and gradually increases in thickness/diameter until a maximum thickness/diameter is reached at or near a midpoint (e.g., roughly halfway between ends 122, 124). Balloon 110 may be formed of any suitable material that is durable, yet capable of fully (or almost fully) inflating in response to the outward force of fill material 120 when fill material 120 self-expands. In some embodiments, balloon 110 has an outer diameter of no more than 100 millimeters (e.g., in the range of 35 to 100 millimeters, 75 to 100 millimeters, or 39 to 55 millimeters, etc.) when fully expanded.

Fill material 120 may be selected and/or designed at the time of manufacture to achieve a desired hardness, compressibility, compressive strength, and/or other parameters that simulate a typical stool. For example, fill material 120 may include an open cell foam or other material that, when compressed from its fully expanded state (as shown in FIG. 1B) to a state in which its diameter or width is only 30% to 75% of its peak value, exerts an outward force of between 0.2 and 1.0 pounds per square inch (psi). In one embodiment, fill material 120 has a compressed diameter of approximately 15 millimeters and an expanded diameter of approximately 40 millimeters. Moreover, in some embodiments, the hardness, compressibility, compressive strength, etc. of balloon 110, when in its expanded state as shown in FIG. 1B, may be set during manufacture by over-loading balloon 110 with fill material 120, and/or modifying fill material 120 in other ways. For example, expanded balloon 110 may be made "softer" by incorporating one or more air (or other fluid) pockets within fill material 120. As another example, expanded balloon 110 may be made "harder" by inserting a larger volume of fill material 120 into balloon 110 (and/or using a balloon 110 having a smaller inflated diameter). For instance, the volume of fill material 120 may be increased to a level at which fill material 120 cannot fully expand due to the resistive force of the fully expanded balloon 110.

Catheter 102 includes an opening 140 between seals 134, 136, which causes lumen 108 to be in fluid communication with the interior of balloon 110 and, therefore, fill material 120. Opening 140 may be a circular or other-shaped aperture in the wall of catheter 102 for example. While a single opening 140 is shown in FIGS. 1A and 1B, the wall of catheter 102 may instead include multiple openings along the length of catheter 102 between seals 134, 136.

A termination component 142 provides a means for the clinician to manually and selectively provide/allow, or block, fluid communication between fill material 120 and an environment external to device 100. In particular, termination component 142 provides a fluid-tight seal that, when in a closed state, prevents lumen 108 from being in fluid communication with the environment external to the proximal end 104 of catheter 102. In the example embodiment shown in FIG. 1A, termination component 142 is a proximal cap. In one such embodiment, a clinician may manually pull out the proximal cap to achieve the state shown in FIG. 1B. Alternatively, the proximal cap and the interior of catheter 102 may be threaded, and the clinician may manually unscrew the threaded cap to achieve the state shown in FIG. 1B. In other embodiments, termination component 142 may be a valve (e.g., a stopcock) that is positioned at the proximal end 104 of catheter 102, or at any other suitable position along catheter 102 that is proximal to seal 136. In one such embodiment, the clinician may manually turn a lever of the valve to open the valve, in order to achieve the state shown in FIG. 1B.

One or more portions of device 100 may be lubricated (e.g., with a silicone gel) during manufacture, or by the clinician just prior to insertion, to facilitate insertion of device 100 into a patient's rectum. For example, lubrication may cover distal cap 130, and/or may cover some or all of the exterior of balloon 110. Regardless of whether device 100 is lubricated, after the clinician has inserted at least balloon 110 of device 100 into the patient's rectum, the clinician may open termination component 142 (e.g., pull out or unscrew the cap, or open the valve, etc.). The pressure gradient between the interior of balloon 110 and the external environment (e.g., the clinician's office) causes air from the external environment to enter an opening 144 at the proximal end 104 of catheter 102, travel along lumen 108, and enter fill material 120 through opening 140, thereby causing fill material 120 to expand to the state shown in FIG. 1B. In some embodiments and/or scenarios, the clinician leaves termination component 142 in an open state (e.g., leaves the proximal cap shown in FIG. 1A off of catheter 102) while the patient attempts to defecate device 110. For example, it may be necessary to leave termination component 142 in an open state in order to allow air flow through lumen 108 as the patient's sphincter compresses balloon 110 (e.g., for the reasons discussed below in connection with FIGS. 5 and 6, relating to a timing function). In other embodiments and/or scenarios, the clinician may again close termination component 142 after device 100 has been properly inserted, to prevent excessive low compression-setting of fill material 120 by the squeezing of the patient's sphincter.

In some embodiments, device 100 may be equipped with one or more components (e.g., a flow sensor, electronic display, etc.) that assist the clinician in determining whether the patient expelled at least balloon 110 of device 100 in a timely manner. Various embodiments of such components are discussed further below, in connection with FIGS. 5 and 6. If the patient cannot expel device 100, the clinician may need to manually assist with the removal. For example, the clinician may simply grasp and pull on one or two portions of catheter 102 that is/are proximal of balloon 110. If the clinician encounters difficulty with the removal, other techniques may be used. For example, the clinician may apply suction to proximal opening 144, or may insert a syringe needle into fill material 120 (e.g., via lumen 108) while the plunger is fully depressed, and then pull back the plunger to create a vacuum or near-vacuum that at least partially collapses fill material 120. Once fill material 120 is at least partially collapsed (e.g., to or near the state shown in FIG. 1A), the clinician may more easily withdraw device 100 by pulling on catheter 102.

In an alternative embodiment and/or scenario, device 100 may be provided to the clinician in the expanded state shown in FIG. 1B. The clinician may then manually compress fill material 120 by using his or her hand to squeeze balloon 110. If termination component 142 is initially closed, the clinician may open termination component 142 prior to compressing fill material 120. While the fill material 120 is being compressed by the clinician, he or she may close termination component, e.g., by inserting or screwing on the distal cap, or by closing the valve. Device 100 may then be inserted as described above, possibly after adding lubrication.

Turning next to FIGS. 2A and 2B, cutaway views of an anorectal expulsion device 200 are depicted. FIG. 2A depicts device 200 in its deflated state, at a time prior to insertion of device 200 into the patient's rectum (e.g., the form in which device 200 is provided by a supplier, in some embodiments). FIG. 2A may also represent the form of device 200 while the clinician inserts device 200 into the patient's rectum, and for some relatively short time period thereafter. FIG. 2B depicts device 200 in its expanded state, at a time after device 200 has been inserted and (in some embodiments) the clinician has caused device 200 to change from its deflated state to the expanded/inflated state (as discussed further below).

Device 200 includes a catheter 202 having a proximal end 204 and a distal end 206, with the wall of catheter 202 defining a lumen 208. While FIG. 2A depicts only a single lumen 208, in other embodiments catheter 202 may include two or more lumens extending between proximal end 204 and distal end 206. Device 200 also includes a distal balloon 210 having a proximal end 212 and a distal end 214. Balloon 210 may surround the entire circumference of the wall of catheter 202 between the balloon's proximal end 212 and distal end 214, and includes an opening at proximal end 212 (and possibly also at distal end 214) to permit passage of catheter 202. In the embodiment of FIG. 2A, distal end 214 of balloon 210 is roughly aligned with distal end 206 of catheter 202.

While FIGS. 2A and 2B show a simplified representation in which catheter 202 is terminated by an integral wall at its distal end 206 and balloon 210 is represented as an oval or circle, it is understood that the features/components of device 200 may be formed in a number of different ways. For example, balloon 210 and/or other sealing components may be formed in any of the ways discussed above in connection with FIGS. 1A and 1B (e.g., with openings at proximal end 212 and distal end 214 of balloon 210 that are similar to the openings at proximal end 122 and distal end 124 of balloon 110, with proximal and/or distal seals similar to proximal seal 136 and/or distal seal 134, and/or with a distal cap similar to distal cap 130, etc.). Using these or other suitable designs, and also due to the components at or near the proximal end 204 of catheter 202 (as discussed below), the interior of balloon 210 is prevented from being in fluid communication with the environment external to device 200.

Catheter 202 may be tubular in shape, for example, and may be formed of silicone, PVC, polyurethane, and/or any other suitable material. Preferably, catheter 202 is formed of a material that provides enough stiffness for a clinician grasping catheter 202 at a location proximal to balloon 210 to easily feed device 200 into the patient's rectum. However, the material may be flexible enough to allow catheter 202 (or at least, a proximal portion of catheter 202) to be easily bent by the clinician. In some embodiments, catheter 202 has an outer diameter that is fixed between 1 and 20 millimeters. Preferably, the outer diameter is between 10 and 15 millimeters. Catheter 202 may be long enough to extend well outside the patient's body even when balloon 210 is entirely within the patient's rectum (e.g., inserted past the sphincter).

In some embodiments, the interior of balloon 210 (i.e., the space between the wall of balloon 210 and the exterior of the wall of catheter 202, and between the two ends 212, 214 of balloon 210) is not pre-loaded with any material. That is, to the extent that the interior of balloon 210 may include any space outside of catheter 202, that space may only contain air or another gas when in the deflated state of FIG. 2A. In some embodiments, however, the interior of balloon 210 and lumen 208 are in a vacuum or near-vacuum state when balloon 210 is deflated, in order to facilitate inflation when gas is released into lumen 208 (as discussed below). Balloon 210 may be formed of any suitable material that is durable, yet capable of fully (or almost fully) inflating in response to the increased pressure when gas is released into lumen 208 (as discussed below). While a spherical balloon 210 is depicted in FIG. 2B, it is understood that balloon 210 may be formed so as to have other shapes when inflated (e.g., a shape that more closely approximates a typical stool). In some embodiments, balloon 210 has an outer diameter of no more than 100 millimeters (e.g., in the range of 50 to 100 millimeters, 75 to 100 millimeters, or 39 to 55 millimeters, etc.) when fully inflated.

Catheter 202 includes openings 240, 242, along the length of catheter 202 that lies between the ends 212, 214 of balloon 210. Openings 240, 242 cause lumen 208 to be in fluid communication with the interior of balloon 210. Openings 240, 242 may be circular or other-shaped apertures in the wall of catheter 202, for example. While two openings 240, 242 are shown in FIGS. 2A and 2B, the wall of catheter 202 may instead include more or fewer openings along the length of catheter 202 that lies between the ends 212, 214 of balloon 210.

A gas cylinder 250 with a compressed (high pressure) gas reservoir 252 is coupled to the proximal end 204 of catheter 202 via a connector 254 of gas cylinder 250. Gas reservoir 252 may contain compressed carbon dioxide (CO2), compressed nitrogen (N2), or any other suitable type of compressed gas. In the embodiment depicted in FIGS. 2A and 2B, gas cylinder 250 utilizes a screw compression system, in which connector 254 includes a female threaded portion that mates to a corresponding male threaded portion at the proximal end 204 of catheter 202. Alternatively, connector 254 of gas cylinder 250 may include the male threaded portion. Regardless, gas cylinder 250 may include a spike 256 having a pointed end facing gas reservoir 252.

Catheter 202 also includes a relief valve 260, at a position somewhere between gas cylinder 250 and the proximal end 212 of balloon 210. Relief valve 260 may be a stopcock, for example. When relief valve 260 is closed (as in FIGS. 2A and 2B), a fluid-tight seal is provided between lumen 208 and the external environment. When relief valve 260 is open, lumen 208 is in fluid communication with the environment external to device 200.

Initially (i.e., in the deflated state of device 200 as shown in FIG. 2A), relief valve 260 is closed, and connector 254 is coupled to the proximal end 204 of catheter 202 loosely enough that spike 256 does not puncture a seal surrounding gas reservoir 252, but tightly enough to form a fluid-tight seal between lumen 208 and the environment external to device 200. One or more portions of device 200 may be lubricated (e.g., with a silicone gel) during manufacture, or by the clinician just prior to insertion, to facilitate insertion of device 200 into a patient's rectum. For example, lubrication may cover the distal end 206 of catheter 202, and/or may cover some or all of the exterior of balloon 210.

Regardless of whether device 200 is lubricated, after the clinician has inserted at least balloon 210 of device 200 into the patient's rectum, the clinician may manually screw connector 254 such that connector 254 mates more tightly to the corresponding connector at the proximal end 204 of catheter 202 (or, if connector 254 is fixed to catheter 202, such that connector 254 mates more tightly to the corresponding connector on gas cylinder 250). By this action, connector 254 or its corresponding/mating connector forces spike 256 into, and causes spike 256 to puncture, the seal around gas reservoir 252. Spike 256 may include or be surrounded by one or more openings, such that the pressure gradient causes gas inside reservoir 252 to flow through the opening(s) on or around spike 256 into lumen 208, through the catheter openings 240, 242, and into the interior of balloon 210, thereby causing balloon 210 to expand to the state shown in FIG. 2B. As noted above, the balloon may fill faster, and/or may maintain higher pressure, if the interior of balloon 210 and lumen 208 were initially in a vacuum or near-vacuum state. In any event, the gas volume/pressure may cause the inflated balloon 210 to closely approximate the size and/or compressibility of a typical stool. In some embodiments, the amount of gas is designed to make the expanded balloon 210 of FIG. 2B have a certain compressibility or compressive strength, etc. For example, when balloon 210 is compressed from its fully expanded state (shown in FIG. 2B) to a state in which its diameter or width is only 50% to 75% of its peak value, balloon 210 may exert an outward force of between 0.2 and 1.0 psi.

In some embodiments, gas cylinder 250 may be a part of a handle assembly that provides easy leverage to the clinician when tightening gas cylinder 250 onto catheter 202. Other arrangements are also possible. For example, a squeeze handle may cause a spike similar to spike 256 to puncture the seal around gas reservoir 252, or spike 256 may impinge upon the seal by the clinician pushing gas cylinder 250 directly into the proximal end 204 of catheter 202, etc.

In some embodiments, device 200 may be equipped with one or more components (e.g., a pressure sensor, electronic display, etc.) that assist the clinician in determining whether the patient expelled at least balloon 210 of device 200 in a timely manner. Various embodiments of such components are discussed further below, in connection with FIGS. 5 and 6. If the patient cannot expel device 200, the clinician may need to manually assist with the removal. For example, the clinician may grasp and pull on one or two portions of catheter 202 that is/are proximal of balloon 210. Prior to pulling, to facilitate removal, the clinician may open relief valve 260, thereby allowing the gases inside balloon 210 to escape into the atmosphere and decreasing the size of balloon 210.

Turning next to FIGS. 3A and 3B, cutaway views of an anorectal expulsion device 300 are depicted. FIG. 3A depicts device 300 in its deflated state, at a time prior to insertion of device 300 into the patient's rectum (e.g., the form in which device 300 is provided by a supplier, in some embodiments). FIG. 3A may also represent the form of device 300 while the clinician inserts device 300 into the patient's rectum, and for some relatively short time period thereafter. FIG. 3B depicts device 300 in its expanded state, at a time after device 300 has been inserted and (in some embodiments) the clinician has caused device 300 to change from its deflated state to the expanded/inflated state (as discussed further below).

Device 300 includes a catheter 302 having a proximal end 304 and a distal end 306, with the wall of catheter 302 defining a lumen 308. While FIG. 3A depicts only a single lumen 308, in other embodiments catheter 302 may include two or more lumens extending between proximal end 304 and distal end 306. Device 300 also includes a distal balloon 310 having a proximal end 312 and a distal end 314. Distal balloon 310 may surround the entire circumference of the wall of catheter 302 between the balloon's proximal end 312 and distal end 314, and includes an opening at proximal end 312 (and possibly also at distal end 314) to permit passage of catheter 302. In the embodiment of FIG. 3A, distal end 314 of distal balloon 310 is roughly aligned with distal end 306 of catheter 302.

While FIGS. 3A and 3B show a simplified representation in which catheter 302 is terminated by an integral wall at its distal end 306 and distal balloon 310 is represented as an oval or circle, it is understood that the features/components of device 300 may be formed in a number of different ways. For example, distal balloon 310 and/or other sealing components may be formed in any of the ways discussed above in connection with FIGS. 1A and 1B (e.g., with openings at proximal end 312 and distal end 314 of balloon 310 that are similar to the openings at proximal end 122 and distal end 124 of balloon 110, with proximal and/or distal seals similar to proximal seal 136 and/or distal seal 134, and/or with a distal cap similar to distal cap 130, etc.). Using these or other suitable designs, and also due to the components at or near the proximal end 304 of catheter 302 (as discussed below), the interior of distal balloon 310 is prevented from being in fluid communication with the environment external to device 300.

Catheter 302 may be tubular in shape, for example, and may be formed of silicone, PVC, polyurethane, and/or any other suitable material. Preferably, catheter 302 is formed of a material that provides enough stiffness for a clinician grasping catheter 302 at a location proximal to distal balloon 310 to easily feed device 300 into the patient's rectum. However, the material may be flexible enough to allow catheter 302 (or at least, a proximal portion of catheter 302) to be easily bent by the clinician. In some embodiments, catheter 302 has an outer diameter that is fixed between 1 and 20 millimeters. Preferably, the outer diameter is between 10 and 15 millimeters. Catheter 302 may be long enough to extend well outside the patient's body even when distal balloon 310 is entirely within the patient's rectum (e.g., inserted past the sphincter).

In some embodiments, the interior of distal balloon 310 (i.e., the space between the wall of distal balloon 310 and the exterior of the wall of catheter 302, and between the two ends 312, 314 of distal balloon 310) is not pre-loaded with any material. That is, to the extent that the interior of balloon 210 may include any space outside of catheter 302, that space may only contain air or another fluid when in the deflated state of FIG. 3A. In some embodiments, however, the interior of distal balloon 310 and at least a portion of lumen 308 are in a vacuum or near-vacuum state when deflated, in order to facilitate inflation when fluid is forced into distal balloon 310 via lumen 308 (as discussed below).

Distal balloon 310 may be formed of any suitable material that is durable, yet capable of fully (or almost fully) inflating in response to the pressure applied when fluid is forced into distal balloon 310 via lumen 308 (as discussed below). While a roughly spherical distal balloon 310 is depicted in FIG. 3B, it is understood that distal balloon 310 may be formed so as to have other shapes when inflated (e.g., a shape that more closely approximates a typical stool). In some embodiments, balloon 310 has an outer diameter of no more than 100 millimeters (e.g., in the range of 50 to 100 millimeters, 75 to 100 millimeters, or 39 to 55 millimeters, etc.) when fully inflated.

Catheter 302 includes openings 340, 342 along the length of catheter 302 that lies between the ends 312, 314 of distal balloon 310. Openings 340, 342 cause lumen 308 to be in fluid communication with the interior of distal balloon 310. Openings 340, 342 may be circular or other-shaped apertures in the wall of catheter 302 for example. While two openings 340, 342 are shown in FIGS. 3A and 3B, the wall of catheter 302 may instead include more or fewer openings along the length of catheter 302 that lies between the ends 312, 314 of distal balloon 310.

Device 300 also includes a proximal balloon 350 that is coupled to the proximal end 304 of catheter in a fluid-tight manner (e.g., using a seal similar to one of seals 134, 136 of FIGS. 1A and 1B), to prevent fluid communication between lumen 308 at the proximal end 304 of catheter 302, and the environment external to device 300. To selectively prevent transfer of fluid from proximal balloon 350 to distal balloon 310 (or vice versa), catheter 302 includes a valve 352. Valve 352 is located on catheter 302 at a position somewhere between proximal balloon 350 and the proximal end 312 of distal balloon 310. Valve 352 may be a stopcock, for example. When closed (as in FIG. 3A), valve 352 provides a fluid-tight seal between the interiors of distal balloon 310 and proximal balloon 350. When valve 352 is open (as in FIG. 3B), the interior of distal balloon 310 is in fluid communication with the interior of proximal balloon 350.

Initially (i.e., in the state of device 300 shown in FIG. 3A), valve 352 is closed, proximal balloon 350 is inflated with air, water, or another suitable fluid, and distal balloon 310 is mostly or entirely deflated. One or more portions of device 300 may be lubricated (e.g., with a silicone gel) during manufacture, or by the clinician just prior to insertion, to facilitate insertion of device 300 into a patient's rectum. For example, lubrication may cover the distal end 306 of catheter 302, and/or may cover some or all of the exterior of distal balloon 310.

Regardless of whether device 300 is lubricated, after the clinician has inserted at least distal balloon 310 of device 300 into the patient's rectum, the clinician may open valve 352, and then manually squeeze proximal balloon 350 until most of the air, water, or other fluid within proximal balloon 350 has transferred to the distal side of valve 352 and caused distal balloon 310 to inflate, as shown in FIG. 3B. While still squeezing proximal balloon 350, the clinician may (e.g., with his/her other hand) close valve 352, thereby preventing the air, water, or other fluid from returning to proximal balloon 350 when he/she stops squeezing proximal balloon 350. The inflated distal balloon 310 may closely approximate the size and/or compressibility of a typical stool. In some embodiments, the amount of fluid is designed to make the expanded distal balloon 310 of FIG. 3B have a certain compressibility or compressive strength, etc. For example, when the inflated distal balloon 310 is compressed from its fully expanded state (shown in FIG. 3B) to a state in which its diameter or width is only 50% to 75% of its peak value, distal balloon 310 may exert an outward force of between 0.2 and 1.0 psi.

In some embodiments, an additional mechanism (not shown in FIGS. 3A and 3B) facilitates compression of proximal balloon 350. For example, device 300 may include a proximal handle with a squeeze-trigger (e.g., coupled to two plates that compress proximal balloon 350) that provides additional leverage. As another example, the transfer of air, water, or other fluid from proximal balloon 350 to distal balloon 310 may be facilitated by forming proximal balloon 350 of a material that, relative to the material of distal balloon 310, exhibits a larger resistive/inward force when filled with fluid.

In some embodiments, device 300 may be equipped with one or more components (e.g., a flow sensor, electronic display, etc.) that assist the clinician in determining whether the patient expelled at least distal balloon 310 of device 300 in a timely manner. Various embodiments of such components are discussed further below, in connection with FIGS. 5 and 6. If the patient cannot expel device 300, the clinician may need to manually assist with the removal. For example, the clinician may grasp and pull on one or two portions of catheter 302 that is/are proximal of distal balloon 310. Prior to pulling, to facilitate removal, the clinician may open valve 352, thereby allowing the air, water, or other fluid inside distal balloon 310 to at least partially return to proximal balloon 350, and decreasing the size of distal balloon 310.

Turning next to FIGS. 4A and 4B, cutaway views of an anorectal expulsion device 400 are depicted. FIG. 4A depicts device 400 in its deflated state, at a time prior to insertion of device 400 into the patient's rectum (e.g., the form in which device 400 is provided by a supplier, in some embodiments). FIG. 4A may also represent the form of device 400 while the clinician inserts device 400 into the patient's rectum, and for some relatively short time period thereafter. FIG. 4B depicts device 400 in its expanded state, at a time after device 400 has been inserted and (in some embodiments) the clinician has caused device 400 to change from its deflated state to the expanded/inflated state (as discussed further below).

Device 400 includes a catheter 402 having a proximal end 404 and a distal end 406, with the wall of catheter 402 defining a lumen 408. While FIG. 4A depicts only a single lumen 408, in other embodiments catheter 402 may include two or more lumens extending between proximal end 404 and distal end 406. Device 400 also includes a balloon 410 having a proximal end 412 and a distal end 414. Balloon 410 may surround the entire circumference of the wall of catheter 402 between the balloon's proximal end 412 and distal end 414, and includes an opening at proximal end 412 (and possibly also at distal end 414) to permit passage of catheter 402. In the embodiment of FIG. 4A, distal end 414 of distal balloon 410 is roughly aligned with distal end 406 of catheter 402.

While FIGS. 4A and 4B show a simplified representation in which catheter 402 is terminated by integral walls at its ends 404, 406, and distal balloon 410 is represented as an oval or circle, it is understood that the features/components of device 400 may be formed in a number of different ways. For example, distal balloon 410 and/or other sealing components may be formed in any of the ways discussed above in connection with FIGS. 1A and 1B (e.g., with openings at proximal end 412 and distal end 414 of balloon 410 that are similar to the openings at proximal end 122 and distal end 124 of balloon 110, with proximal and/or distal seals similar to proximal seal 136 and/or distal seal 134, with a distal cap similar to distal cap 130, and/or with a proximal cap similar to termination component 142, etc.). Using these or other suitable designs, the interior of distal balloon 410 is prevented from being in fluid communication with the environment external to device 400.

Catheter 402 may be tubular in shape, for example, and may be formed of silicone, PVC, polyurethane, and/or any other suitable material. Preferably, catheter 402 is formed of a material that provides enough stiffness for a clinician grasping catheter 402 at a location proximal to balloon 410 to easily feed device 400 into the patient's rectum. However, the material may be flexible enough to allow catheter 402 (or at least, a proximal portion of catheter 402) to be easily bent by the clinician. In some embodiments, catheter 402 has an outer diameter that is fixed between 1 and 20 millimeters. Preferably, the outer diameter is between 10 and 15 millimeters. Catheter 402 may be long enough to extend well outside the patient's body even when balloon 410 is entirely within the patient's rectum (e.g., inserted past the sphincter).

In some embodiments, the interior of balloon 410 (i.e., the space between the wall of balloon 410 and the exterior of the wall of catheter 402, and between the two ends 412, 414 of balloon 410) is not pre-loaded with any material. That is, to the extent that the interior of balloon 210 may include any space outside of catheter 402, that space may only contain air or another gas when in the deflated state of FIG. 4A. In some embodiments, however, the interior of balloon 410 and a distal portion of lumen 408 are initially in a vacuum or near-vacuum state, in order to facilitate inflation when an expansion reaction occurs in lumen 408 (as discussed below). Balloon 410 may be formed of any suitable material that is durable, yet capable of fully (or almost fully) inflating in response to the pressure applied when the expansion reaction occurs in lumen 408 (as discussed below). While a roughly spherical balloon 410 is depicted in FIG. 4B, it is understood that balloon 410 may be formed so as to have other shapes when inflated (e.g., a shape that more closely approximates a typical stool). In some embodiments, balloon 410 has an outer diameter of no more than 100 millimeters (e.g., in the range of 50 to 100 millimeters, 75 to 100 millimeters, or 39 to 55 millimeters, etc.) when fully inflated.

Catheter 402 includes openings 440, 442 along the length of catheter 402 that lies between the ends 412, 414 of balloon 410. Openings 440, 442 cause at least the distal portion of lumen 408 to be in fluid communication with the interior of balloon 410. Openings 440, 442 may be circular or other-shaped apertures in the wall of catheter 402 for example. While two openings 440, 442 are shown in FIGS. 4A and 4B, the wall of catheter 402 may instead include more or fewer openings along the length of catheter 402 between the ends 412, 414 of balloon 410.

Catheter 402 includes a valve 450 that is proximal of balloon 410, but some distance distal of the proximal end 404 of catheter 402. Valve 450 may be a stopcock, for example. Initially (i.e., as in the state shown in FIG. 4A), valve 450 is closed, preventing proximal and distal portions of lumen 408 from being in fluid communication with each other. As seen in FIG. 4A, a first material 452 is pre-loaded into a portion of lumen 408 that is distal of valve 450, while a second material 454 is pre-loaded into a portion of lumen 408 that is proximal of valve 450. The first material 452 and second material 454 are materials that, when brought into contact with each other, create a chemical expansion reaction. For example, materials 452 and 454 may be components of a two-part expanding foam. In one embodiment, material 452 is sodium bicarbonate and material 454 is hydrogen peroxide (or vice versa). In some embodiments, at least material 452 is a solid (e.g., tightly packed sodium bicarbonate powder) or a low-viscosity fluid (e.g., a foam), in order to prevent some or all of material 452 from moving into balloon 410 while in the initial state shown in FIG. 4A.

Initially (i.e., in the state of device 400 as shown in FIG. 4A), as noted above, valve 450 is closed, and balloon 410 is mostly or entirely deflated. One or more portions of device 400 may be lubricated (e.g., with a silicone gel) during manufacture, or by the clinician just prior to insertion, to facilitate insertion of device 400 into a patient's rectum. For example, lubrication may cover the distal end 406 of catheter 402, and/or may cover some or all of the exterior of balloon 410. Regardless of whether device 400 is lubricated, after the clinician has inserted at least balloon 410 of device 400 into the patient's rectum, the clinician may open valve 450, causing the proximal and distal portions of lumen 408 to be in fluid communication, and materials 452 and 454 to come into contact. To facilitate physical contact or mixing, material 454 may be a liquid (e.g., hydrogen peroxide), and/or a pressure gradient may have been introduced during manufacture (e.g., by partially filling a portion of lumen 408 proximal of material 454 with compressed gas, etc.).

Upon coming into contact and/or mixing, materials 452 and 454 create a chemical expansion reaction, resulting in a compound or mixture 456 with a volume that is greater than the sum of the individuals volumes of materials 452 and 454 prior to their interaction. In embodiments where one of materials 452, 454 is sodium bicarbonate and the other is hydrogen peroxide, for example, compound or mixture 456 may be a mixture of sodium hydroxide, carbon dioxide, and water. The relatively large volume of compound or mixture 456 increases the pressure within lumen 408 and (via openings 440, 442) within balloon 410. The increased volume/pressure causes balloon 410 to expand to the state shown in FIG. 4B. The inflated balloon 410 may closely approximate the size and/or compressibility of a typical stool. In some embodiments, the amounts and types of materials 452 and 454 are designed to make the expanded balloon 410 of FIG. 4B have a certain compressibility or compressive strength, etc. For example, when the inflated balloon 410 is compressed from its fully expanded state (shown in FIG. 4B) to a state in which its diameter or width is only 50% to 75% of its peak value, balloon 410 may exert an outward force of between 0.2 and 1.0 psi.

In some embodiments, device 400 is pre-loaded with more than two reactive materials that come into contact when valve 450 is opened. Moreover, in some embodiments, device 400 may be equipped with one or more components (e.g., a pressure sensor, electronic display, etc.) that assist the clinician in determining whether the patient expelled at least balloon 410 of device 400 in a timely manner. Various embodiments of such components are discussed further below, in connection with FIGS. 5 and 6. If the patient cannot expel device 400, the clinician may need to manually assist with the removal. For example, the clinician may grasp and pull on one or two portions of catheter 402 that is/are proximal of balloon 410. In some embodiments, catheter 402 also includes a relief valve (e.g., similar to relief valve 260 of FIGS. 2A, 2B), which the clinician can open to release pressure within balloon 210, thereby allowing balloon 210 to at least partially deflate prior to removal.

Each of the aspects shown in FIGS. 1 through 4 is associated with certain advantages. For example, all of devices 100, 200, 300 and 400 may be relatively low cost and easy to use. Other advantages may be specific to different ones of devices 100, 200, 300 and 400. Due to its fill material 120, for example, device 100 of FIGS. 1A, 1B may be particularly well-suited for mimicking certain properties of stool (e.g., compressibility, etc.). As another example, by opening relief valve 260, device 200 of FIGS. 2A, 2B may be particularly easy to remove if the patient cannot expel device 200. Similarly, by re-opening valve 352 and allowing proximal balloon 350 to at least partially refill, device 300 of FIGS. 3A, 3B may be particularly easy to remove. Moreover, device 300 may be particularly low cost because it does not (in some embodiments) require any special fill material or reactive materials, etc. As yet another example, device 100 of FIGS. 1A, 1B (due to its low compression-set fill material 120), device 200 of FIGS. 2A, 2B (due to the compressed gas in gas cylinder 250), and device 400 of FIGS. 4A, 4B (due to its use of an expansion reaction) each may have a relatively small overall size when in the initial state, which may be useful for packaging, storage, etc.

As noted above, any of devices 100, 200, 300 or 400 may be equipped with one or more components that assist the clinician in determining whether the patient expelled at least the distal balloon portion of the anorectal expulsion device in a timely manner. Various examples of such embodiments will now be described in connection with FIG. 5. FIG. 5 depicts a portion of an example self-inflating anorectal expulsion device 500 with features for determining and indicating expulsion time. In the example embodiment of FIG. 5, device 500 includes a catheter 502 and a proximal cap 504, which may correspond to catheter 102 and termination component 142 of device 100 of FIGS. 1A, 1B, for example. It is understood, however, that device 500 may correspond to any one of devices 100, 200, 300 or 400. For example, device 500 may correspond to device 200, with catheter 502 corresponding to catheter 202, but with proximal cap 504 being replaced by gas cylinder 250. As another example, device 500 may correspond to device 300, with catheter 502 corresponding to catheter 302, but with proximal cap 504 being replaced by proximal balloon 350. As still another example, device 500 may correspond to device 400, with catheter 502 corresponding to catheter 402, and with proximal cap 504 being included or replaced by an integral, proximal wall of catheter 502.

As seen in FIG. 5, device 500 also includes a timer reset button 510, an electronic display 512, and an LED 514. Electronic display 512 may be a liquid crystal display (LCD), a light-emitting diode (LED) display, or any other suitable type of electronic display. LED 514 may be a single diode (e.g., a diode that turns green when passing current), or a set of two or more diodes (e.g., one or more diodes that turn green when passing current and/or one or more diodes that turn red when passing current, such that LED 514 turns green if the patient passes device 500 in a "normal" amount of time and red if it takes the patient longer to pass device 500). The operation of timer reset button 510, electronic display 512, and LED 514 is described in further detail below, in connection with FIG. 6.

In other embodiments, device 500 may omit one or both of electronic display 512 and LED 514, and/or may include one or more other suitable components. For example, device 500 may include LED 514 but not electronic display 512, may include electronic display 512 but not LED 514, or may omit both electronic display 512 and LED 514 and instead include a mechanical indicator (e.g., a button that pops out when triggered) or an audio indicator (e.g., a speaker), and so on. Moreover, any of components 510, 512 and 514 may have a different appearance (e.g., shape), and/or be located at a different position on device 500, as compared to the embodiment of FIG. 5. Further, timer reset button 510 may instead be a toggle switch or other type of manual control, or may be omitted entirely (e.g., if an automatic trigger is used, as discussed below).

FIG. 6 is a block diagram of example electronic components 600 that may be included in anorectal expulsion device 500 of FIG. 5. As seen in FIG. 6, the electronic components 600 may include a processing unit 602, a flow sensor 604, one or more visual indicators 606, and a power unit 610. Processing unit 602 may include one or more processors positioned near a proximal end of catheter 502 (e.g., within a small module fixed to catheter 502, or integrated within a wall of catheter 502, etc.), or at another suitable location. In one embodiment, processing unit 602 includes only hardware processors, such as one or more application-specific integrated circuits (ASICs), or one or more field-programmable gate arrays (FPGAs), for example. In other embodiments, processing unit 602 instead, or also, includes at least one microprocessor configured to execute software instructions stored in a persistent memory (e.g., solid state memory) of electronic components 600 (not shown in FIG. 6).

Processing unit 602 is coupled to flow sensor 604 and visual indicator 606. Flow sensor 604 may be a miniature device positioned at least partially within a lumen of device 500. For example, flow sensor 604 may be positioned within lumen 108 of FIGS. 1A, 1B, lumen 208 of FIGS. 2A, 2B, lumen 308 of FIGS. 3A, 3B, or lumen 408 of FIGS. 4A, 4B. Flow sensor 604 may be configured to measure fluid (gas or liquid) flow from the proximal end to the distal end of the lumen within catheter 502, and vice versa.

Visual indicator(s) 606 may include one or more electronic components that provide a visual output to the clinician, to indicate the amount of time taken to expel at least a distal balloon of device 500, and/or whether that time is within some predetermined threshold time. In the embodiment of FIG. 5, visual indicator(s) 606 correspond to both electronic display 512 and LED 514. As noted above, however, one or both of these may be omitted, and/or other indicators (not necessarily electronic) may be used. Moreover, while not shown in FIG. 5 or 6, electronic components 600 may also, or instead, include an audio indicator, such as a speaker configured to emit a beep and/or other sounds.

Power unit 610 may include one or more batteries (e.g., a small lithium battery), which may be at a proximal end of catheter 502 or within proximal cap 504, for example. Other suitable power sources may instead, or also, be used. For example, power unit 610 may include a photovoltaic cell or panel on a proximal, exterior portion of catheter 502. Power unit 610 may also include one or more voltage regulators and/or other circuitry, and may be electrically coupled to processing unit 602, flow sensor 604, and visual indicator(s) 606 in order to provide power (e.g., DC voltage and current) thereto.

In operation, after the clinician inserts anorectal expulsion device 500 into the patient's rectum, and immediately after causing the distal balloon of device 500 to inflate (e.g., by removing proximal cap 502, or causing a gas cylinder to be punctured, etc.), the clinician presses timer reset button 510. Timer reset button 510 may be coupled to processing unit 602, allowing processing unit 602 to detect when timer reset button 502 has been pressed or otherwise activated (e.g., by detecting a ground signal via an electrical circuit that is completed via a contact of button 510, etc.). In response to detecting activation of button 510, processing unit 602 may start or reset a timer. The timer may be implemented in hardware of processing unit 602, for example.

In other embodiments, device 500 provides for an automatic trigger of the timer. For example, flow sensor 604 may detect when fluid has begun to flow in a particular direction, or detect when an initial flow of fluid has ceased or slowed, etc. Processing unit 602 may then automatically start the timer, in response to detecting the flow or particular flow characteristics.

Processing unit 602 may also monitor flow measurements made by flow sensor 604 to determine precisely when the patient has passed the distal balloon of device 500 (e.g., balloon 110 of FIG. 1B) out through the sphincter. Processing unit 602 may use any suitable criteria to make this determination. For example, processing unit 602 may determine that the distal balloon passed through the patient's sphincter when a peak flow of fluid in the proximal direction (through the lumen of catheter 502) is followed by a peak flow of fluid in the distal direction (also through the lumen of catheter 502). This may correspond to the sphincter squeezing the distal balloon, followed by the distal balloon expanding into a larger space when the sphincter has been traversed. In other embodiments, other suitable criteria or algorithms may be used.

In some embodiments, other sensors, besides (or in addition to) flow sensor 604 may be used to determine when expulsion occurs. Other sensor types may be particularly useful in embodiments where device 500 is a closed system that does not allow fluid to pass freely through the lumen of catheter 502 in the proximal direction (or at least, greatly restricts flow in the proximal direction). In an embodiment where device 500 is device 200 of FIGS. 2A, 2B and catheter 502 is catheter 202, for example, the fixed volume of catheter 502 may not allow sufficient (if any) flow in the proximal direction. The same may be true in an embodiment where device 500 is device 400 of FIGS. 4A, 4B and catheter 502 is catheter 402. In these embodiments, therefore, it may be preferable to use another mechanism for detecting passage of the distal balloon through the sphincter. For example, flow sensor 604 may instead be one or more pressure sensors located within the lumen of catheter 502 (e.g., mounted to an interior of the wall of catheter 502), and electrically coupled to processing unit 602. Processing unit 602 may then determine that the distal balloon has passed through the patient's sphincter in response to the pressure sensor(s) indicating a peak pressure (due to peak compression of the distal balloon by the sphincter) followed by a minimum pressure (due to the distal balloon passing into a larger space after traversing the sphincter), for example.

Thus, timer reset button 510, processing unit 602, and flow sensor 604 (or alternatively, one or more pressure sensors) may collectively constitute a means for determining the amount of time before the patient expels at least the distal balloon of device 500. Regardless of the precise determining means employed by device 500, upon determining that the distal balloon has passed out of the patient's sphincter, processing unit 602 may cause visual indicator 606 to indicate one or more pieces of timing-related information to the clinician, depending on the embodiment. For example, processing unit 602 may cause electronic display 512 to begin displaying an active count of seconds in response to detecting the clinician's activation of timer reset button 510, and then cause electronic display 512 to freeze the displayed count in response to determining that the distal balloon passed through the patient's sphincter. The electronic display 512 may continue to display the count, frozen at the time of stoppage, for a predetermined amount of time, or until the clinician again activates button 510, for example.

Additionally, or alternatively, processing unit 602 may cause LED 514 to provide a binary indicator of whether the time to expulsion (i.e., between the clinician activating button 510 and the distal balloon passing through the patient's sphincter) is less than a predetermined threshold value (e.g., 30 seconds, or 45 seconds, etc.). Expulsion in less than the threshold time may be indicative of healthy anorectal function, for example. In some embodiments, processing unit 602 causes LED 514 to generate light of a first wavelength (e.g., green light) if the expulsion time is less than the threshold value, but causes LED 514 to generate light of a second wavelength (e.g., red light) if the expulsion time is greater than the threshold value.

Thus, visual indicator(s) 606 (e.g., electronic display 512, LED 514, and/or another suitable visual indicator) may constitute a means for providing a visual indicator based on the amount of time elapsed before the patient expels at least the distal balloon of device 500. Moreover, as noted above, device 500 may also, or instead, include a means for providing an audio indicator based on the amount of time elapsed before the patient expels at least the distal balloon of device 500, such as a speaker that generates a beep sound when the expulsion time first exceeds the threshold value, for example.

Figure 8:
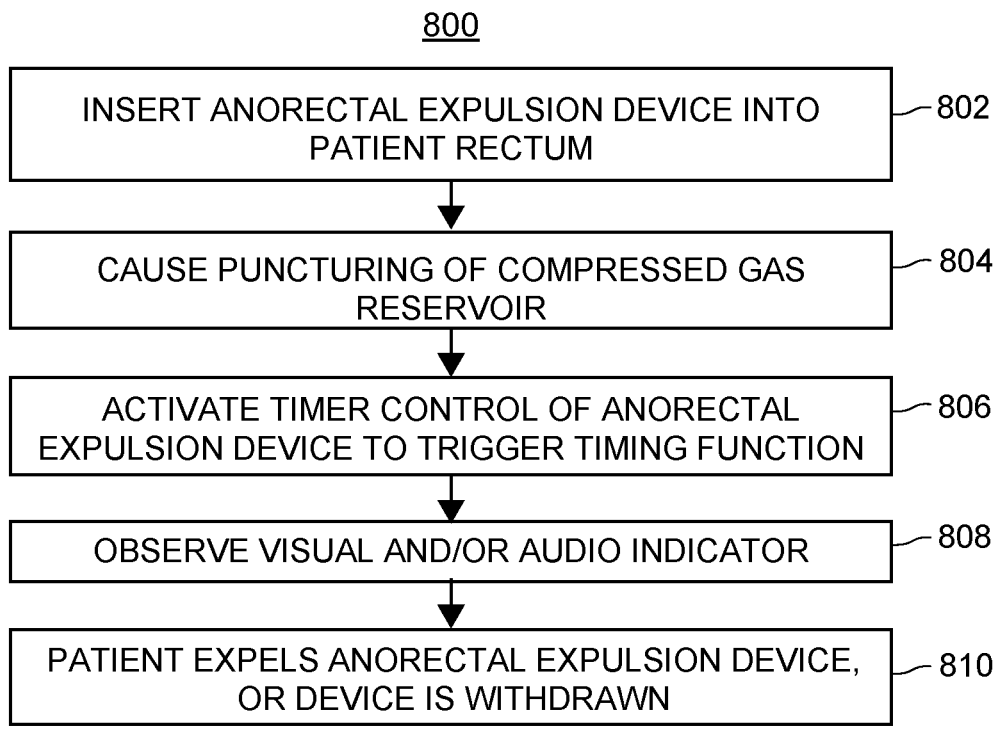
FIG. 8 is a flow diagram of an example method for testing the anorectal expulsion function of a patient using a second anorectal expulsion device.
Figure 9:
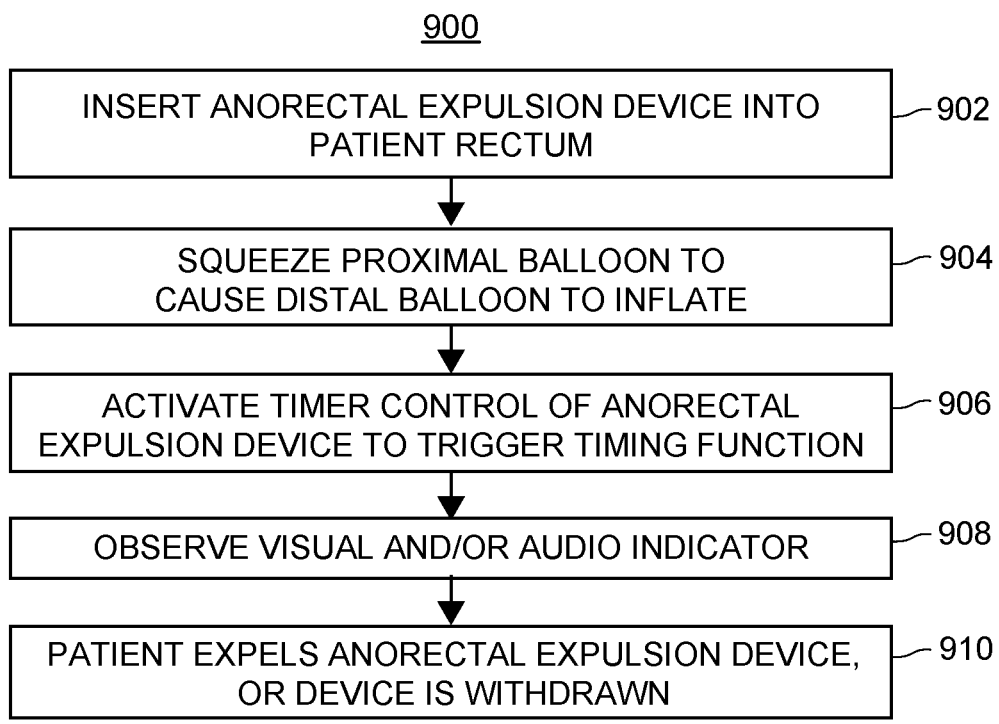
FIG. 9 is a flow diagram of an example method for testing the anorectal expulsion function of a patient using a third anorectal expulsion device.
Figure 10:
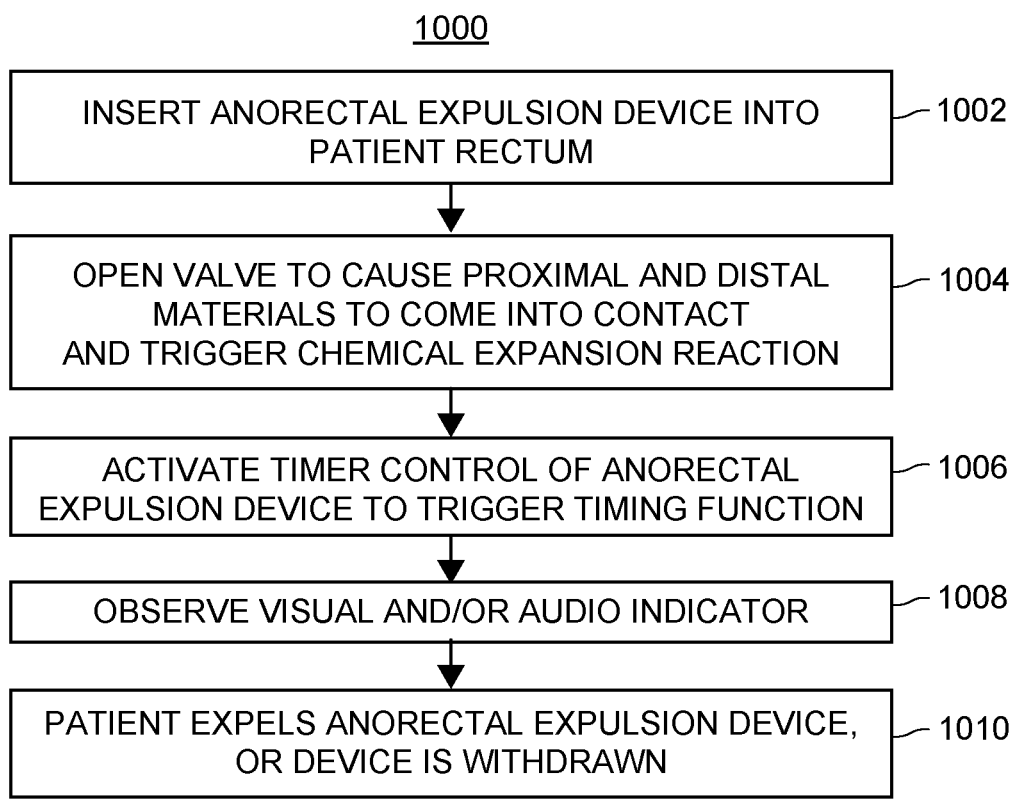
FIG. 10 is a flow diagram of an example method for testing the anorectal expulsion function of a patient using a fourth anorectal expulsion device.

Various example methods for using an anorectal expulsion device to test the anorectal expulsion function of a patient will now be described with reference to FIGS. 7 through 10. In particular, FIG. 7 illustrates a method that may utilize device 100 of FIGS. 1A, 1B, FIG. 8 illustrates a method that may utilize device 200 of FIGS. 2A, 2B, FIG. 9 illustrates a method that may utilize device 300 of FIGS. 3A, 3B, and FIG. 10 illustrates a method that may utilize device 400 of FIGS. 4A, 4B.

Figure 7:
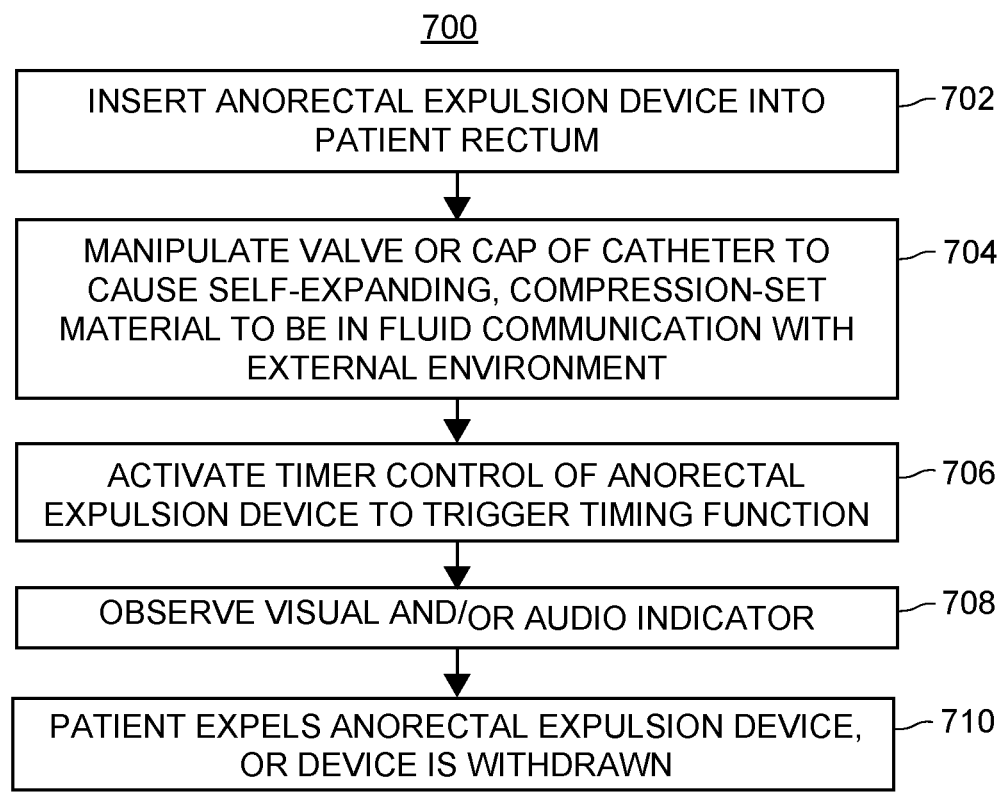
FIG. 7 is a flow diagram of an example method for testing the anorectal expulsion function of a patient using a first anorectal expulsion device.

Turning first to FIG. 7, an example method 700 for testing the anorectal expulsion function of a patient includes inserting, at block 702, an anorectal expulsion device into a patient's rectum. The anorectal expulsion device includes a catheter with at least one lumen, and a balloon at or near the distal end of the catheter. The distal balloon is at least partially filled with a self-expanding, low compression-set material, i.e., a material that can be compressed by an inwardly-directed external force (e.g., squeezing of the material), but automatically returns to its fully expanded state (or at least substantially returns to its fully expanded state) when exposed to atmospheric pressure and not acted upon by other external forces. The material may be an open cell foam (e.g., open cell polyurethane foam), for example. The anorectal expulsion device may be device 100 of FIGS. 1A, 1B, for example (with block 702 occurring while the device is in the state shown in FIG. 1A), or another, similar device.

In some embodiments, method 700 includes, prior to block 702, another block in which the clinician adds lubrication to at least a portion of the exterior of the device (e.g., at least the distal balloon and/or a distal tip or cap on the catheter), and/or another block in which the clinician manually squeezes the distal balloon to compress the fill material within the balloon. In other embodiments, the device is already lubricated, and/or the distal balloon and fill material are already compressed, when the device is in its initial (e.g., packaged) state. To insert the device, the clinician may grasp the distal balloon and/or a portion of the catheter proximal to the distal balloon, and feed the distal balloon (and possibly part of the catheter proximal to the distal balloon) into the patient's rectum, past the patient's sphincter.

After the clinician has fully inserted the device, at block 704, the clinician manipulates either a valve or a cap of the catheter to cause the fill material in the distal balloon to be in fluid communication with the environment external to the lumen of the device catheter and external to the patient's body, i.e., the fill material may be exposed to the atmospheric pressure within the clinician's office or other examination room. The valve or cap may correspond to any of the embodiments of termination component 142 of FIG. 1A, for example. The exposure to atmospheric/room pressure causes the fill material to expand, thereby inflating the balloon (e.g., as discussed above with reference to FIG. 1B).

At block 706, the clinician activates a timer control of the anorectal expulsion device, to trigger a timing function. For example, the clinician may press a button similar to timer reset button 510 of FIG. 5, or may flip a toggle switch, etc., and a processing unit coupled to the timer control (e.g., processing unit 602 of FIG. 6) may start a timer in response to detecting the activation. In various embodiments and/or scenarios, block 706 may occur shortly before block 704, at the same time as block 704, or shortly after block 704.

In some embodiments, block 706 instead includes an automatic trigger of the timing function. For example, a flow sensor in the catheter lumen (e.g., a flow sensor that is also used to detect device expulsion, such as flow sensor 604 of FIG. 6) may detect when air from the room environment has begun to flow into or towards the distal balloon (indicating that the clinician has removed the cap or opened the valve), or detect when that initial intake of air has ceased (indicating that the distal balloon has finished expanding), etc. A processing unit in communication with the flow sensor (e.g., processing unit 602 of FIG. 6) may then start the timer in response to detecting the flow or particular flow characteristics. In some embodiments, method 700 excludes block 706.

At block 708, the clinician observes a visual and/or audio indicator to determine whether the patient expels at least the distal balloon of the device in an expected (or normal, etc.) amount of time. The visual and/or audio indicator may include an electronic display that shows the current state (e.g., count of seconds) of the timer (e.g., electronic display 512 of FIG. 5), a binary visual indicator of whether the count has passed a threshold amount of time (e.g., LED 514 of FIG. 5, or a mechanical pop-out button, etc.), a binary audio indicator of whether the count has passed a threshold amount of time (e.g., a beep emitted by a speaker of the device), and/or another suitable type of visual or audio indicator. In some embodiments, method 700 excludes block 708.

At block 710, the patient may successfully expel the anorectal expulsion device, in which case the clinician (or assistant, etc.) may need to take no further action apart from disposing of (or cleaning, storing, etc.) the device. If the patient is unable to expel the device within some reasonable time frame, however, the clinician may instead at block 710 withdraw the device from the patient's rectum. In this latter scenario, block 710 may simply involve the clinician pulling on a proximal portion of the catheter, for example. In other embodiments, block 710 may include the clinician first taking other measures to facilitate painless removal, such as inserting a syringe needle into the fill material (possibly through the catheter) while the plunger is depressed, and then withdrawing the plunger to achieve a near vacuum in the fill material, thereby causing the fill material to collapse/shrink.

Referring next to FIG. 8, an example method 800 for testing the anorectal expulsion function of a patient includes inserting, at block 802, an anorectal expulsion device into a patient's rectum. The anorectal expulsion device includes a catheter with at least one lumen, and a balloon at or near the distal end of the catheter. The proximal end of the catheter is coupled to a gas cylinder by a connector that, when sufficiently tightened, causes a spike to puncture a gas reservoir within the cylinder. The anorectal expulsion device may be device 200 of FIGS. 2A, 2B, for example (with block 802 occurring while the device is in the state shown in FIG. 2A), or another, similar device.

In some embodiments, method 800 includes, prior to block 802, another block in which the clinician adds lubrication to at least a portion of the exterior of the device (e.g., at least the distal balloon and/or a distal tip or cap on the catheter). In other embodiments, the device is already lubricated when the device is in its initial (e.g., packaged) state.

To insert the device, the clinician may grasp the distal balloon and/or a portion of the catheter proximal to the distal balloon, and feed the distal balloon (and possibly part of the catheter proximal to the distal balloon) into the patient's rectum, past the patient's sphincter. After the clinician has fully inserted the device, at block 804, the clinician causes a gas reservoir to be punctured. For example, the clinician may more tightly screw a gas cylinder onto threads at the proximal end of the catheter (or press the cylinder into the proximal end of the catheter, etc.), causing a spike on the connector to puncture a gas reservoir within a compressed gas cylinder. The release of the compressed gas into the lower pressure space of the lumen and distal balloon causes the distal balloon to inflate (e.g., as discussed above with reference to FIG. 2B).

At block 806, the clinician activates a timer control of the anorectal expulsion device, to trigger a timing function. For example, the clinician may press a button similar to timer reset button 510 of FIG. 5, or may flip a toggle switch, etc., and a processing unit coupled to the timer control (e.g., processing unit 602 of FIG. 6) may start a timer in response to detecting the activation. In various embodiments and/or scenarios, block 806 may occur shortly before block 804, at the same time as block 804, or shortly after block 804.

In some embodiments, block 806 instead includes an automatic trigger of the timing function. For example, a flow sensor in the catheter lumen (e.g., flow sensor 604 of FIG. 6) may detect when the compressed gas has begun to flow into or towards the distal balloon (indicating that the clinician has caused the gas reservoir to be punctured), or detect when the initial intake of gas has ceased or slowed (indicating that the distal balloon has finished expanding), etc. A processing unit in communication with the flow sensor (e.g., processing unit 602 of FIG. 6) may then start the timer in response to detecting the flow or particular flow characteristics. In some embodiments, method 800 excludes block 806.

At block 808, the clinician observes a visual and/or audio indicator to determine whether the patient expels at least the distal balloon of the device in an expected (or normal, etc.) amount of time. The visual and/or audio indicator may include an electronic display that shows the current state (e.g., count of seconds) of the timer (e.g., electronic display 512 of FIG. 5), a binary visual indicator of whether the count has passed a threshold amount of time (e.g., LED 514 of FIG. 5, or a mechanical pop-out button, etc.), a binary audio indicator of whether the count has passed a threshold amount of time (e.g., a beep emitted by a speaker of the device), and/or another suitable type of visual or audio indicator. In some embodiments, method 800 excludes block 808.

At block 810, the patient may successfully expel the anorectal expulsion device, in which case the clinician (or assistant, etc.) may need to take no further action apart from disposing of (or cleaning, storing, etc.) the device. If the patient is unable to expel the device within some reasonable time frame, however, the clinician may instead at block 810 withdraw the device from the patient's rectum. In this latter scenario, block 810 may simply involve the clinician pulling on a proximal portion of the catheter, for example. In other embodiments, block 810 may include the clinician first taking other measures to facilitate painless removal, such as opening a release valve in a portion of the catheter that is proximal to the distal balloon (e.g., release valve 260 of FIGS. 2A, 2B), thereby causing the balloon to deflate.

Referring next to FIG. 9, an example method 900 for testing the anorectal expulsion function of a patient includes inserting, at block 902, an anorectal expulsion device into a patient's rectum. The anorectal expulsion device includes a catheter with at least one lumen, and a balloon at or near the distal end of the catheter that is initially deflated. The proximal end of the catheter is coupled to another, proximal balloon that is initially inflated/filled with fluid (e.g., air or water), and a valve along the length of the catheter is initially closed to prevent fluid communication between the proximal and distal balloons. The anorectal expulsion device may be device 300 of FIGS. 3A, 3B, for example (with block 902 occurring while the device is in the state shown in FIG. 3A), or another, similar device.

In some embodiments, method 900 includes, prior to block 902, another block in which the clinician adds lubrication to at least a portion of the exterior of the device (e.g., at least the distal balloon and/or a distal tip or cap on the catheter). In other embodiments, the device is already lubricated when the device is in its initial (e.g., packaged) state.

To insert the device, the clinician may grasp the distal balloon and/or a portion of the catheter proximal to the distal balloon, and feed the distal balloon (and possibly part of the catheter proximal to the distal balloon) into the patient's rectum, past the patient's sphincter. After the clinician has fully inserted the device, at block 904, the clinician may open the valve of the catheter, and then use his or her hand to squeeze the proximal balloon. The pressure applied by the clinician's hand (along with any pressure gradient already existing between the proximal and distal balloons) forces the fluid within the proximal balloon to travel into the catheter lumen and distal balloon, which in turn causes the distal balloon to inflate (e.g., as discussed above with reference to FIG. 3B). The clinician may then close the valve to prevent fluid from flowing back into the proximal balloon when he or she stops squeezing the proximal balloon.

At block 906, the clinician activates a timer control of the anorectal expulsion device, to trigger a timing function. For example, the clinician may press a button similar to timer reset button 510 of FIG. 5, or may flip a toggle switch, etc., and a processing unit coupled to the timer control (e.g., processing unit 602 of FIG. 6) may start a timer in response to detecting the activation. In various embodiments and/or scenarios, block 906 may occur shortly before block 904, at the same time as block 904, or shortly after block 904.

In some embodiments, block 906 instead includes an automatic trigger of the timing function. For example, a flow sensor in the catheter lumen (e.g., a flow sensor that is also used to detect device expulsion, such as flow sensor 604 of FIG. 6) may detect when the fluid has begun to flow from the proximal balloon towards the distal balloon (indicating that the clinician has begun squeezing the proximal balloon), or detect when the initial flow of fluid from the proximal balloon to the distal balloon has ceased or slowed (indicating that the distal balloon has finished expanding), etc. A processing unit in communication with the flow sensor (e.g., processing unit 602 of FIG. 6) may then start the timer in response to detecting the flow or particular flow characteristics. In some embodiments, method 900 excludes block 906.

At block 908, the clinician observes a visual and/or audio indicator to determine whether the patient expels at least the distal balloon of the device in an expected (or normal, etc.) amount of time. The visual and/or audio indicator may include an electronic display that shows the current state (e.g., count of seconds) of the timer (e.g., electronic display 512 of FIG. 5), a binary visual indicator of whether the count has passed a threshold amount of time (e.g., LED 514 of FIG. 5, or a mechanical pop-out button, etc.), a binary audio indicator of whether the count has passed a threshold amount of time (e.g., a beep emitted by a speaker of the device), and/or another suitable type of visual or audio indicator. In some embodiments, method 900 excludes block 908.

At block 910, the patient may successfully expel the anorectal expulsion device, in which case the clinician (or assistant, etc.) may need to take no further action apart from disposing of (or cleaning, storing, etc.) the device. If the patient is unable to expel the device within some reasonable time frame, however, the clinician may instead at block 910 withdraw the device from the patient's rectum. In this latter scenario, block 910 may simply involve the clinician pulling on a proximal portion of the catheter, for example. In other embodiments, block 910 may include the clinician first taking other measures to facilitate painless removal, such as opening the catheter valve to allow some fluid to flow from the distal balloon back into the proximal balloon, thereby causing the distal balloon to at least partially deflate.

Referring next to FIG. 10, an example method 1000 for testing the anorectal expulsion function of a patient includes inserting, at block 1002, an anorectal expulsion device into a patient's rectum. The anorectal expulsion device includes a catheter, and a balloon at or near the distal end of the catheter. The proximal end of the catheter is closed to the external environment, and the catheter includes a valve at some point between the distal balloon and the proximal end of the catheter. The catheter lumen includes a first material on the distal side of the valve, and a second material on the proximal side of the valve, with the two materials being materials that cause a chemical expansion reaction when brought into contact with each other (e.g., sodium bicarbonate and hydrogen peroxide). The anorectal expulsion device may be device 400 of FIGS. 4A, 4B, for example (with block 1002 occurring while the device is in the state shown in FIG. 4A), or another, similar device.

In some embodiments, method 1000 includes, prior to block 1002, another block in which the clinician adds lubrication to at least a portion of the exterior of the device (e.g., at least the distal balloon and/or a distal tip or cap on the catheter). In other embodiments, the device is already lubricated when the device is in its initial (e.g., packaged) state.

To insert the device, the clinician may grasp the distal balloon and/or a portion of the catheter proximal to the distal balloon, and feed the distal balloon (and possibly part of the catheter proximal to the distal balloon) into the patient's rectum, past the patient's sphincter. After the clinician has fully inserted the device, at block 1004, the clinician opens the catheter valve, allowing the two materials to come into contact. The contact of the materials triggers a chemical expansion reaction that increases the total volume of material, which in turn causes the distal balloon to inflate (e.g., as discussed above with reference to FIG. 4B).

At block 1006, the clinician activates a timer control of the anorectal expulsion device, to trigger a timing function. For example, the clinician may press a button similar to timer reset button 510 of FIG. 5, or may flip a toggle switch, etc., and a processing unit coupled to the timer control (e.g., processing unit 602 of FIG. 6) may start a timer in response to detecting the activation. In various embodiments and/or scenarios, block 1006 may occur shortly before block 1004, at the same time as block 804, or shortly after block 1004.

In some embodiments, block 1006 instead includes an automatic trigger of the timing function. For example, a flow sensor in the catheter lumen (e.g., flow sensor 604 of FIG. 6) may detect when the compressed gas has begun to flow into or towards the distal balloon (indicating that the clinician has caused the gas reservoir to be punctured), or detect when the initial intake of gas has ceased or slowed (indicating that the distal balloon has finished expanding), etc. A processing unit in communication with the flow sensor (e.g., processing unit 602 of FIG. 6) may then start the timer in response to detecting the flow or particular flow characteristics. In some embodiments, method 1000 excludes block 1006.

At block 1008, the clinician observes a visual and/or audio indicator to determine whether the patient expels at least the distal balloon of the device in an expected (or normal, etc.) amount of time. The visual and/or audio indicator may include an electronic display that shows the current state (e.g., count of seconds) of the timer (e.g., electronic display 512 of FIG. 5), a binary visual indicator of whether the count has passed a threshold amount of time (e.g., LED 514 of FIG. 5, or a mechanical pop-out button, etc.), a binary audio indicator of whether the count has passed a threshold amount of time (e.g., a beep emitted by a speaker of the device), and/or another suitable type of visual or audio indicator. In some embodiments, method 1000 excludes block 1008.

At block 1010, the patient may successfully expel the anorectal expulsion device, in which case the clinician (or assistant, etc.) may need to take no further action apart from disposing of (or cleaning, storing, etc.) the device. If the patient is unable to expel the device within some reasonable time frame, however, the clinician may instead at block 1010 withdraw the device from the patient's rectum. In this latter scenario, block 1010 may simply involve the clinician pulling on a proximal portion of the catheter, for example. In other embodiments, block 1010 may include the clinician first taking other measures to facilitate painless removal, such as opening a release valve in a portion of the catheter that is proximal to the distal balloon, thereby causing the balloon to deflate.

We claim:

1. A diagnostic device comprising:
   a balloon having (i) a proximal balloon end, (ii) a distal balloon end, and (iii) a balloon wall that extends between the proximal balloon end and the distal balloon end, wherein:
      the balloon wall defines a balloon interior that contains a self-expanding, low compression-set material,
      a diameter or width of the self-expanding, low compression-set material has a peak value when the self-expanding, low compression-set material is in a fully expanded state, and
      when the self-expanding, low compression-set material is compressed from the fully expanded state to a state in which the diameter or width has a value between 50% and 75% of the peak value, the self-expanding, low compression-set material exerts an outward force of between 0.2 and 1.0 pounds per square inch (psi);
   a catheter having a proximal catheter end and a distal catheter end, wherein the catheter extends through an opening in the proximal balloon end, a lumen of the catheter is in fluid communication with the balloon interior, the self-expanding, low compression-set material has an annular shape that surrounds the catheter and extends to the balloon wall, and the balloon wall is adjacent to an environment external to the diagnostic device; and
   a termination component coupled to the catheter at a position along the catheter that is proximal to the proximal balloon end, wherein (i) when the termination component is in a first physical configuration, the balloon interior is not in fluid communication with an environment external to the catheter at the proximal catheter end, and (ii) when the termination component is in a second physical configuration different than the first physical configuration, the balloon interior is in fluid communication with the environment external to the catheter at the proximal catheter end.

2. The diagnostic device of claim 1, wherein, when the termination component is in the first physical configuration and the self-expanding, low compression-set material is in a compressed state:
   manipulating the termination component into the second physical configuration causes the self-expanding, low compression-set material to expand responsively to a pressure gradient between the balloon interior and the environment external to the catheter at the proximal catheter end.

3. The diagnostic device of claim 1, wherein the self-expanding, low compression-set material is an open cell foam.

4. The diagnostic device of claim 1, wherein the termination component is:
   a proximal cap configured to (i) manually couple to the proximal catheter end to place the termination component in the first physical configuration, and (ii) manually decouple from the proximal catheter end to place the termination component in the second physical configuration; or
   a valve configured to (i) manually close to place the termination component in the first physical configuration, and (ii) manually open to place the termination component in the second physical configuration.

5. The diagnostic device of claim 4, wherein the termination component is the proximal cap configured to (i) manually couple to the proximal catheter end to place the termination component in the first physical configuration, and (ii) manually decouple from the proximal catheter end to place the termination component in the second physical configuration.

6. The diagnostic device of claim 1, wherein the catheter has an outer diameter between 5 and 15 millimeters, wherein an opening in a wall of the catheter connects the lumen to the balloon interior, and wherein the catheter includes no additional lumens.

7. The diagnostic device of claim 1, wherein, when the termination component is in the second physical configuration and a steady state condition has been reached, the balloon (i) has a maximum diameter between 39 and 55 millimeters and (ii) has a length of 40 to 120 millimeters between the proximal balloon end and the distal balloon end.

8. The diagnostic device of claim 1, wherein the catheter includes a flow sensor configured to generate signals indicative of fluid flow through the catheter, and wherein the diagnostic device further comprises:
- a visual indicator component; and
- a processing unit electrically coupled to the flow sensor and the visual indicator component,
- wherein the processing unit is configured to, based on the signals indicative of fluid flow, cause the visual indicator component to present a visual indicator of how long it took a patient to expel at least the balloon of the diagnostic device.

9. The diagnostic device of claim 8, wherein the processing unit is configured to, based on the signals indicative of fluid flow, cause the visual indicator component to present a binary indicator of whether the patient expelled at least the balloon within a threshold amount of time.

10. The diagnostic device of claim 8, further comprising:
- an audio indicator component; and
- a processing unit electrically coupled to the flow sensor and the audio indicator component,
- wherein the processing unit is configured to, based on the signals indicative of fluid flow, cause the audio indicator component to present a binary indicator of whether the patient expelled at least the balloon within a threshold amount of time.

11. The diagnostic device of claim 1, wherein the annular shape that surrounds the catheter extends from the catheter to the balloon wall.

12. A method of testing anorectal expulsion functions of a patient, the method comprising:
- inserting a diagnostic device into a rectum of the patient, wherein:
  - the diagnostic device includes (i) a balloon having a balloon wall that defines a balloon interior containing a self-expanding, low compression-set material in a compressed state and (ii) a catheter extending through a proximal end of the balloon,
  - a diameter or width of the self-expanding, low compression-set material has a peak value when the self-expanding, low compression-set material is in a fully expanded state,
  - when the self-expanding, low compression-set material is compressed from the fully expanded state to a state in which the diameter or width has a value between 50% and 75% of the peak value, the self-expanding, low compression-set material exerts an outward force of between 0.2 and 1.0 pounds per square inch (psi),
  - the self-expanding, low compression-set material has an annular shape that surrounds the catheter and extends to the balloon wall,
  - the balloon wall is adjacent to an environment external to the diagnostic device, and
  - after inserting the diagnostic device, at least a portion of the catheter remains outside of the rectum of the patient; and
- manipulating either (i) a valve in the portion of the catheter, or (ii) a cap on a proximal end of the portion of the catheter, to cause the self-expanding, low compression-set material to be in fluid communication, via the catheter, with an environment external to the portion of the catheter.

13. The method of claim 12, further comprising, prior to inserting the diagnostic device into the rectum of the patient:
- manually compressing the self-expanding, low compression-set material within the balloon to cause the self-expanding, low compression-set material to enter the compressed state; and
- manipulating either the valve or the cap to cause the self-expanding, low compression-set material to not be in fluid communication with the environment external to the portion of the catheter.

14. The method of claim 12, further comprising, after manipulating either the valve or the cap to cause the self-expanding, low compression-set material to be in fluid communication with the environment external to the portion of the catheter:
- activating a timer control of the diagnostic device to trigger a timing function of the diagnostic device.

15. The method of claim 12, wherein the annular shape that surrounds the catheter extends from the catheter to the balloon wall.

* * * * *